US008873628B2

(12) United States Patent
Kim et al.

(10) Patent No.: US 8,873,628 B2
(45) Date of Patent: Oct. 28, 2014

(54) ELECTRONIC DEVICE AND METHOD OF OPERATING THE SAME

(75) Inventors: Kyunghwan Kim, Seoul (KR); Hanyoung Ko, Seoul (KR); Joomin Kim, Seoul (KR); Sungmin Baek, Seoul (KR)

(73) Assignee: LG Electronics Inc., Seoul (KR)

( * ) Notice: Subject to any disclaimer, the term of this patent is extended or adjusted under 35 U.S.C. 154(b) by 373 days.

(21) Appl. No.: 13/424,507

(22) Filed: Mar. 20, 2012

(65) Prior Publication Data

US 2013/0083152 A1 Apr. 4, 2013

Related U.S. Application Data

(60) Provisional application No. 61/541,289, filed on Sep. 30, 2011.

(51) Int. Cl.
*H04N 7/32* (2006.01)
*H04N 7/14* (2006.01)
*H04L 29/06* (2006.01)
*H04N 7/15* (2006.01)

(52) U.S. Cl.
CPC ............... *H04N 7/15* (2013.01); *H04N 7/147* (2013.01); *H04L 65/4053* (2013.01); *H04L 65/1069* (2013.01)
USPC .................................. 375/240.15; 348/208.4

(58) Field of Classification Search
USPC ........... 348/14.08, 208.4; 375/240.15, 240.16
See application file for complete search history.

(56) References Cited

U.S. PATENT DOCUMENTS

| | | | |
|---|---|---|---|
| 6,278,476 B1 | 8/2001 | Ueno | |
| 8,311,200 B2 | 11/2012 | Kang | |
| 2007/0188597 A1 | 8/2007 | Kenoyer | |
| 2008/0123747 A1* | 5/2008 | Lee et al. | 375/240.16 |
| 2010/0321469 A1 | 12/2010 | Jeong | |
| 2011/0019014 A1* | 1/2011 | Oh et al. | 348/208.4 |
| 2012/0327110 A1* | 12/2012 | Kang et al. | 345/620 |
| 2013/0051471 A1* | 2/2013 | Ahn et al. | 375/240.15 |
| 2013/0239062 A1* | 9/2013 | Ubillos et al. | 715/838 |
| 2013/0328925 A1 | 12/2013 | Latta | |

FOREIGN PATENT DOCUMENTS

WO WO 2005/048600 A1 5/2005

OTHER PUBLICATIONS

US Office Action dated Mar. 21, 2014 for U.S. Appl. No. 13/541,869, 7 pages.
U.S. Office Action dated Jul. 9, 2014 for U.S. Appl. No. 13/541,869, 11 pages.
U.S. Office Action dated May 15, 2014 for U.S. Appl. No. 13/417,375, 10 pages.

* cited by examiner

*Primary Examiner* — Mohammad Islam
(74) *Attorney, Agent, or Firm* — Fish & Richardson P.C.

(57) ABSTRACT

An electronic device and a method of operating the electronic device are provided. The method includes obtaining a first image including an interesting object and at least one peripheral object, obtaining relevance of the at least one peripheral object with respect to the interesting object based on at least one of attributes including a state, a motion, and a location of the interesting object, and replacing an area of the whole area of the first image, which is occupied by the interesting object and the other remaining peripheral objects than a specific peripheral object determined based on the relevance, with a second image. According to the embodiments of the present invention, the electronic device and method may provide a vivid video conference.

23 Claims, 24 Drawing Sheets

FIG.3
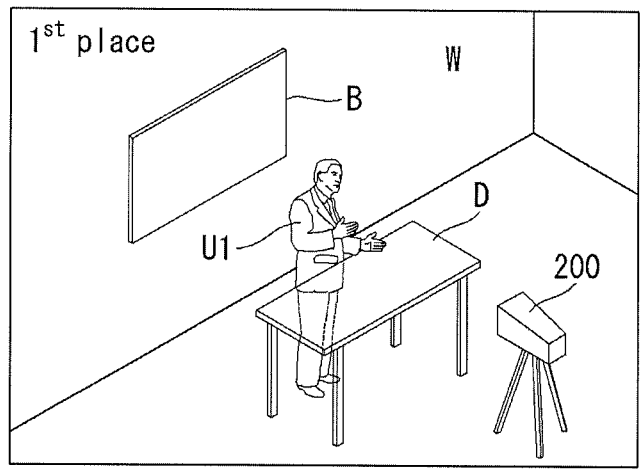
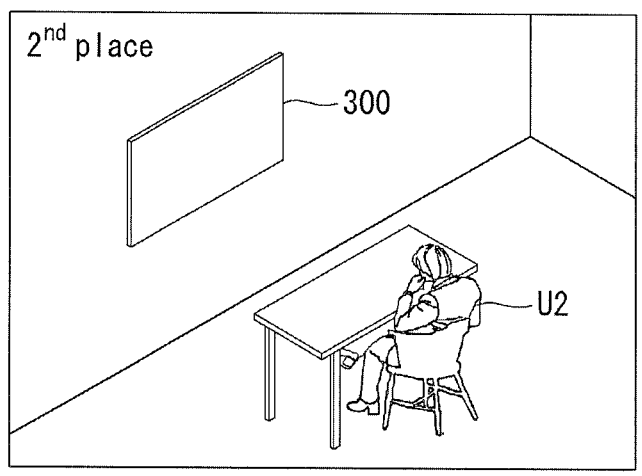

FIRST PLACE

FIRST PLACE

FIRST PLACE

FIG.19
FIRST PLACE
(a)
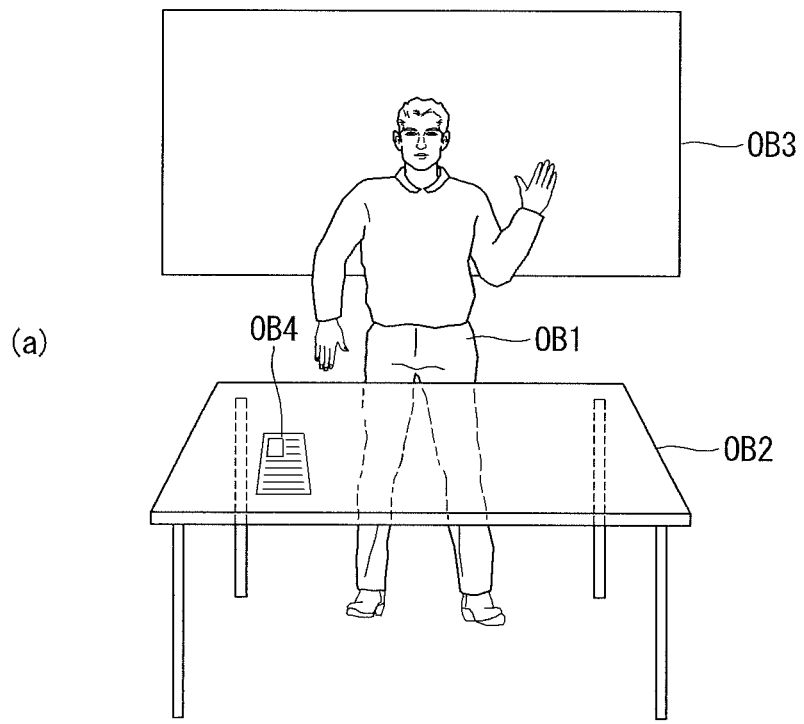
(b)
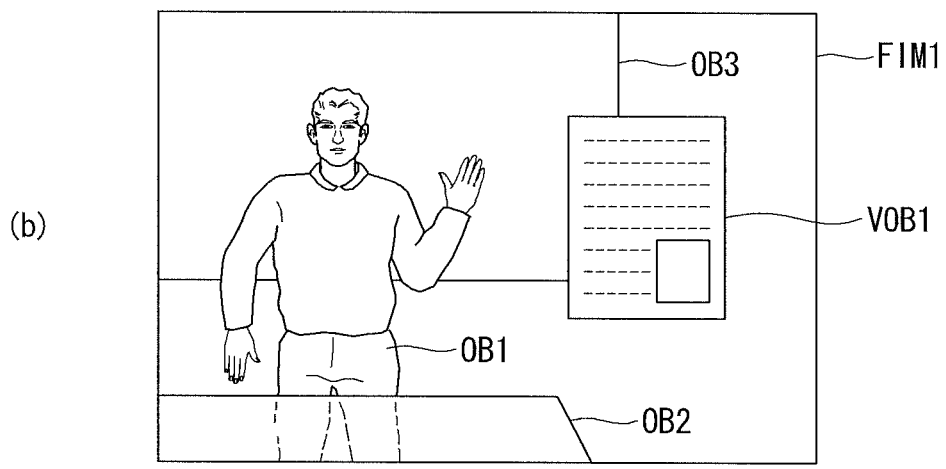

FIG.21
FIRST PLACE
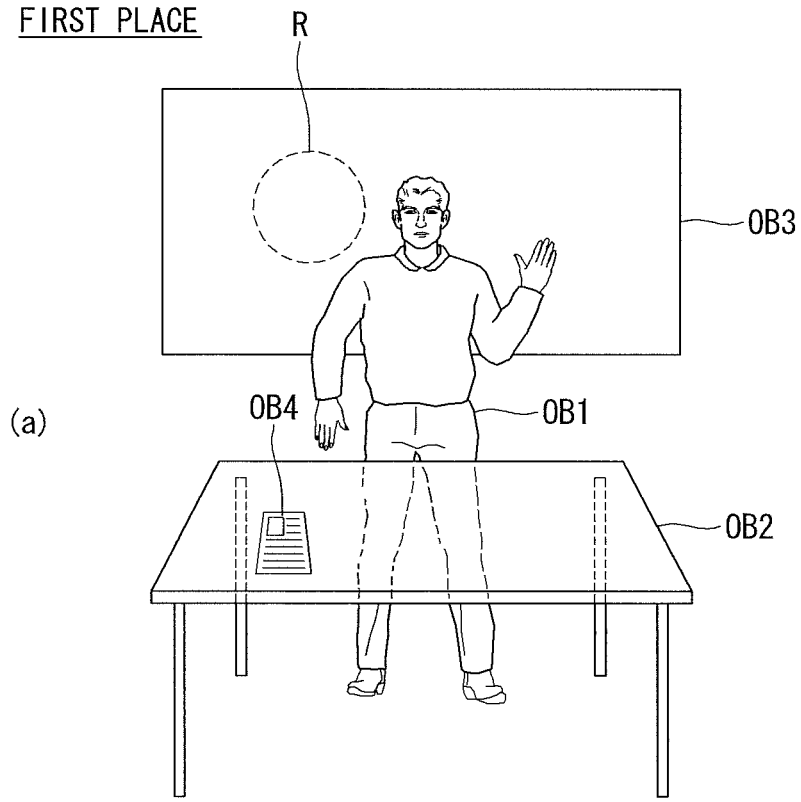
(a)
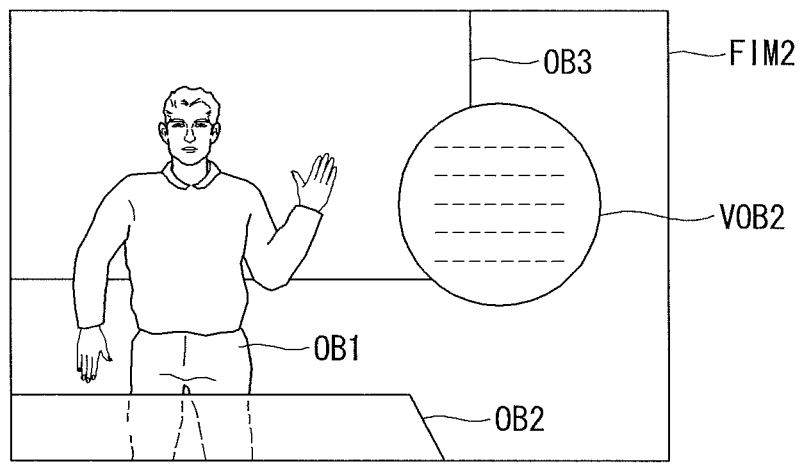
(b)

FIRST PLACE

FIG.23
FIRST PLACE
(a)
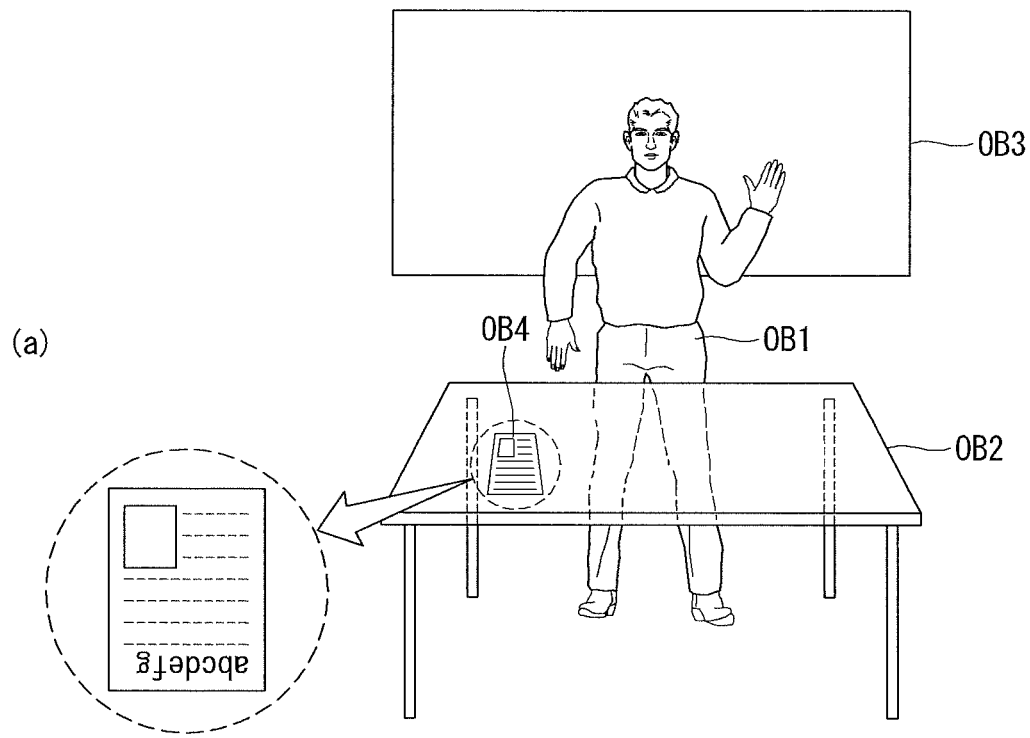
(b)
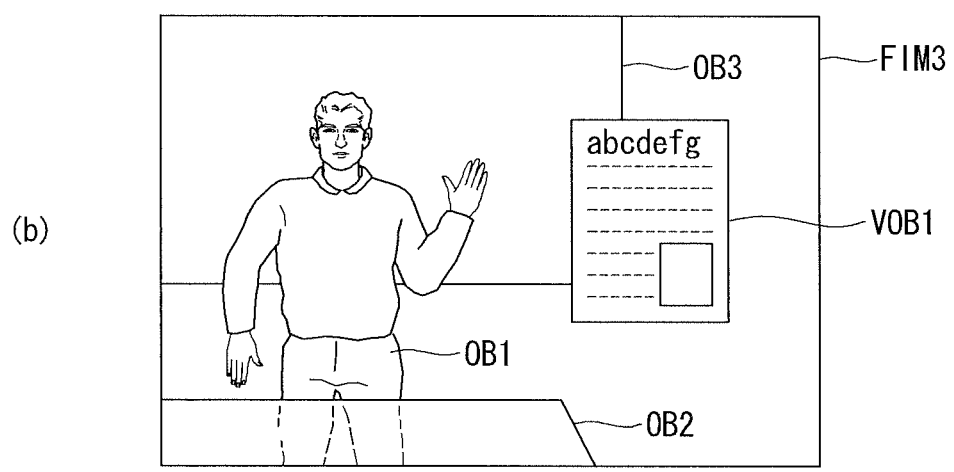

FIG.24
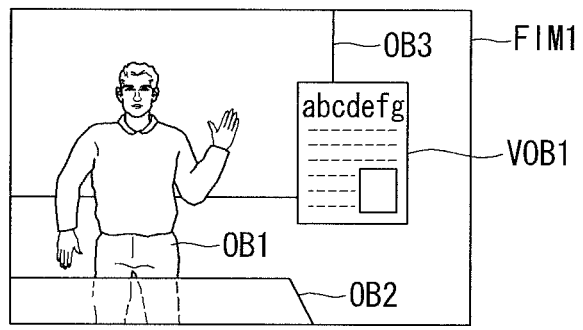
(a)
FIRST PLACE
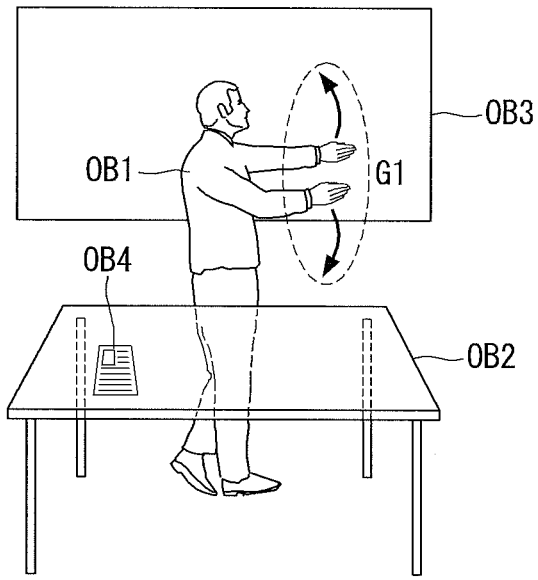
(b)
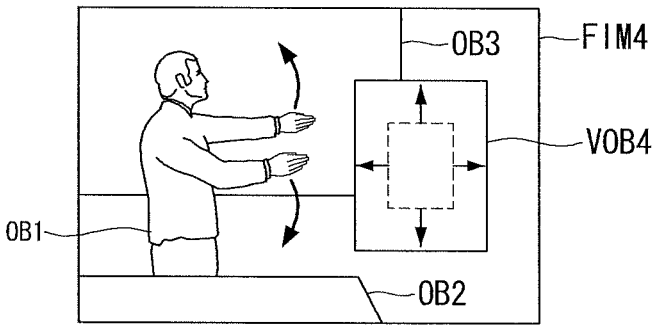
(c)

FIG.25
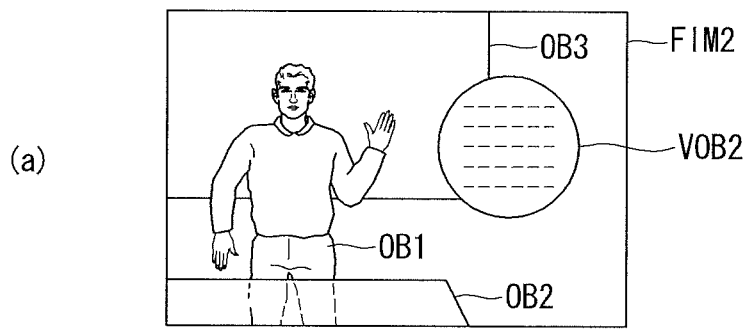
(a)
FIRST PLACE
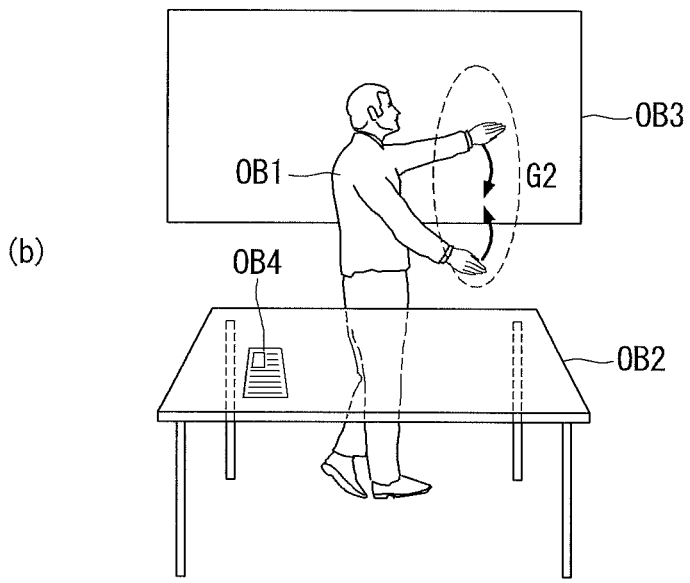
(b)
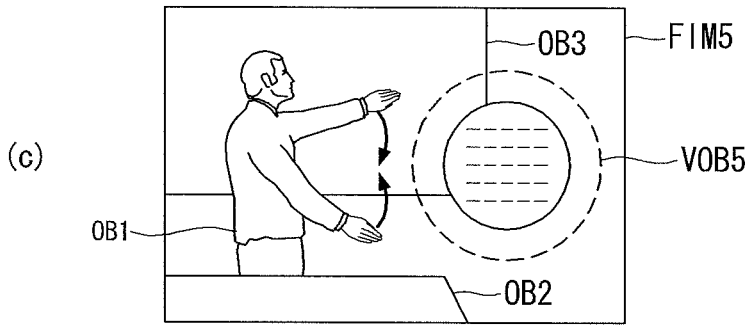
(c)

FIG.26
(a)
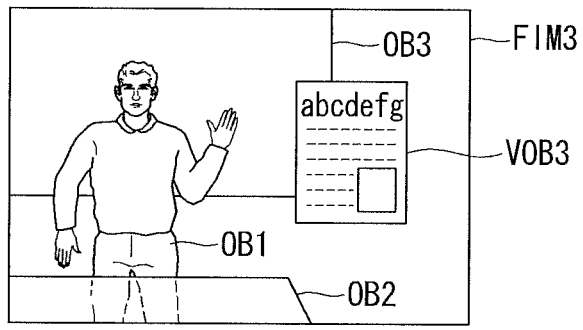
FIRST PLACE
(b)
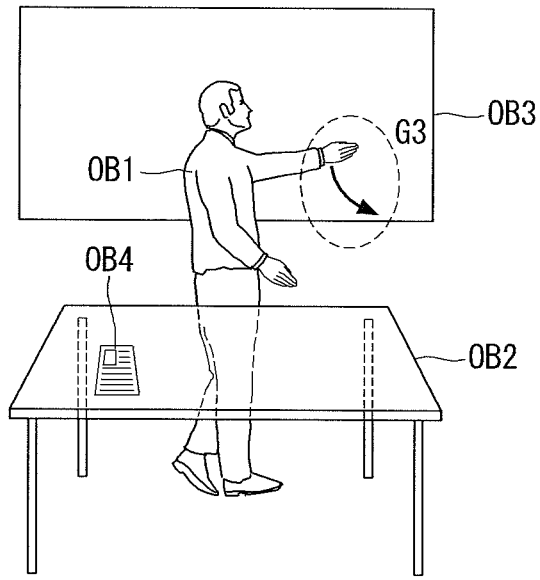
(c)
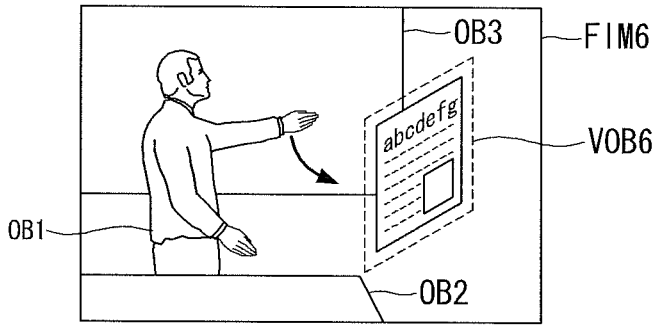

ELECTRONIC DEVICE AND METHOD OF OPERATING THE SAME

CROSS REFERENCE TO RELATED APPLICATION

This application claims priority to U.S. Provisional Application No. 61/541,289, filed on Sep. 30, 2011, the contents of which are herein incorporated by reference in its entirety.

BACKGROUND

1. Technical Field

The embodiments of the present invention are directed to an electronic device and a method of operating the electronic device, and more specifically to an electronic device that may be used for a videoconference and a method of operating the electronic device.

2. Discussion of the Related Art

Tele-presence refers to a set of technologies which allow a person to feel as if they were present. Tele-presence technologies reproduce information on five senses a person feels in a specific space at a remote location. Element technologies for tele-presence may include video, audio, tactile, and network transmission technologies. Such tele-presence technologies are adopted for video conference systems. Tele-presence-based video conference systems provide higher-quality communications and allow users to further concentrate on the conversation compared to conventional video conference systems.

The tele-presence technologies for teleconference systems, although showing a little difference for each and every manufacturer, may be applicable to video, audio, and network transmission technologies as follows:

For video technologies, the tele-presence technologies apply as generating natural eye-contact images for being able to make a user further feel like he would face another user and generating high-resolution images. For audio technologies, the tele-presence technologies apply as audio playback technologies that may create a feeling of a space based on a speaker's location. For network transmission technologies, the tele-presence technologies apply as real-time image/sound transmission technologies based on an MCU (Multi Control Unit).

In contrast to video, audio, and network transmission for video conference systems which have been actively researched, data sharing between attendants in a conference is still not satisfactory. Current video conference systems use a separate monitor for data sharing. Accordingly, when a user shifts his eyes from an image screen to a data screen, the eye contact is not maintained lowering a feeling as if actually facing another user. Moreover, a short drop in conversation occurs at every data manipulation because the data manipulation is conducted by a peripheral device, such as a mouse.

SUMMARY

The embodiments of the present invention provide an electronic device and a method of operating the electronic device, which may allow for a vivid teleconference.

According to an embodiment, there is provided a method of operating an electronic device, the method including obtaining a first image including an interesting object and at least one peripheral object, obtaining relevance of the at least one peripheral object with respect to the interesting object based on at least one of attributes including a state, a motion, and a location of the interesting object, and replacing an area of the whole area of the first image, which is occupied by the interesting object and the other remaining peripheral objects than a specific peripheral object determined based on the relevance, with a second image.

Obtaining the relevance of the at least one peripheral object is performed in consideration of whether part of the interesting object is connected to the peripheral object.

Obtaining the relevance of the at least one peripheral object is performed in consideration of a motion direction in which at least part of the interesting object moves.

Obtaining the relevance of the at least one peripheral object is performed in consideration of a distance between the interesting object and the at least one peripheral object.

Obtaining the relevance of the at least one peripheral object is performed in further consideration of a user's input on the at least one peripheral object.

The method further includes displaying the first image and receiving the user's input on the displayed first image.

Displaying the first image includes making the interesting object and the first peripheral object different in display property from the remaining peripheral objects.

The method further includes transmitting a third image generated by replacing the area occupied by the remaining peripheral objects with the second image to a second electronic device.

The first image includes a moving image.

According to an embodiment, there is provided a method of operating an electronic device, the method including obtaining a first image of an interesting object, obtaining a virtual image corresponding to a specific object determined based on a first motion of the interesting object, obtaining a final image including the virtual image and at least part of the first image in consideration of a display state of the virtual image determined based on a second object of the second motion, and transmitting the final image to a second electronic device.

The display state of the virtual image includes at least one of a location where the virtual image is to be synthesized, a size, an orientation, a rotational state, and a marking state of the virtual image.

Obtaining the final image includes sensing the second motion in real time and changing the display state of the virtual image based on the sensed second motion.

Obtaining the virtual image includes determining whether the first motion is associated with the specific object and selecting the specific object only when the first motion is associated with the specific object.

The virtual image is a 2D image or a 3D image.

According to the embodiments of the present invention, the following effects may be achieved.

First, a user who hosts a conference and/or a distance lecture through an electronic device according to an embodiment of the present invention may transmit an image including only his desired objects (e.g., his and specific peripheral objects) in the place where he hosts the conference to an electronic device that another user uses. In particular, since a specific object desired to be together displayed may be selected without a complicated procedure, the distance conference may be smoothly performed.

Second, a user who hosts a teleconference and/or a distance lecture need not previously create digitalized data of materials, such as audiovisual documentation, necessary for the conference and share the data with attendants.

Third, the embodiments may provide effects of being able to allow the objects, such as handwritten data or shape of a prototype model, to be immediately shared with other attendants while the conference is on the way. For example, a virtual image for an actual object may be instantly obtained and synthesized with an image for the teleconference, and the synthesized image may be transmitted to other users, thereby enabling data necessary for the conference to be immediately shared with the users in a convenience way.

Fourth, since data (e.g., objects) to be shared is stored as virtual images and synthesized with images to be transmitted, a user hosting the conference may easily share desired objects with other users without an effort to make to-be-shared objects oriented toward the camera (for example, an effort for the host to proceed with the conference while holding the to-be-shared data).

Finally, a user may control the displayed location, size, orientation, and a display state, such as rotational state or marking state, of the interesting object to be shared based on his gesture, so that the teleconference and/or distance lecture may be performed more smoothly.

BRIEF DESCRIPTION OF THE DRAWINGS

The embodiments of the present invention will become readily apparent by reference to the following detailed description when considered in conjunction with the accompanying drawings wherein:

FIG. 3 is a view for describing an environment according to an embodiment of the present invention;

FIGS. 17 to 23 are views for describing the type of first motions and a method of determining specific objects based on the first motions according to an embodiment of the present invention;

FIGS. 24 and 25 are views for describing a method of changing a display status of a virtual image according to an embodiment of the present invention; and FIGS. 26A, 26B, and 26C are views for describing a rotational status of a virtual image according to an embodiment of the present invention.

DESCRIPTION OF THE EMBODIMENTS

The present invention will now be described more fully with reference to the accompanying drawings, in which exemplary embodiments of the invention are shown. The invention may, however, be embodied in many different forms and should not be construed as being limited to the embodiments set forth herein; rather, there embodiments are provided so that this disclosure will be thorough and complete, and will fully convey the concept of the invention to those skilled in the art.

Hereinafter, a mobile terminal relating to the present invention will be described below in more detail with reference to the accompanying drawings. In the following description, suffixes "module" and "unit" are given to components of the mobile terminal in consideration of only facilitation of description and do not have meanings or functions discriminated from each other.

Figure 1:
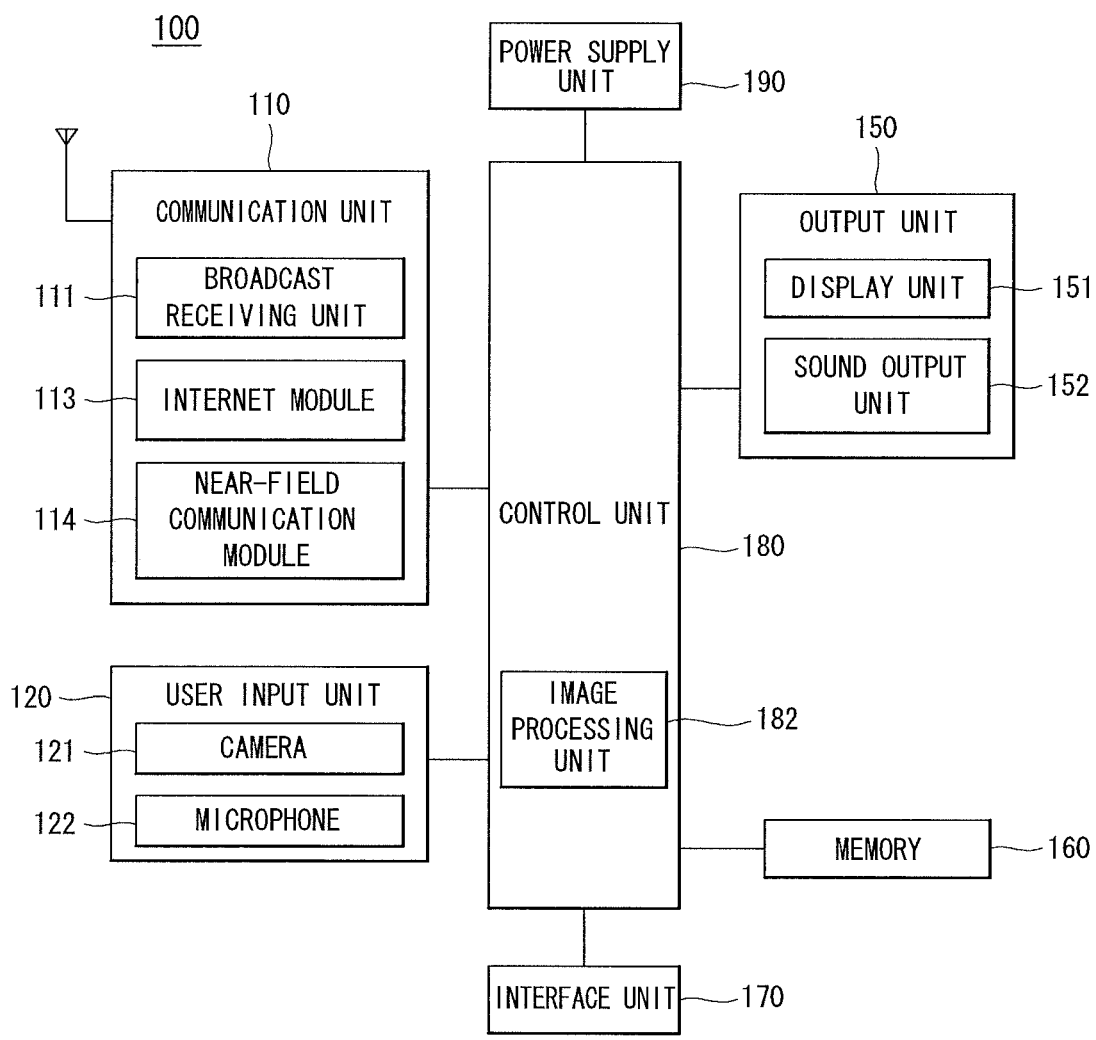
FIG. 1 is a block diagram illustrating an electronic device according to an embodiment of the present invention.

FIG. 1 is a block diagram illustrating an electronic device according to an embodiment of the present invention.

Referring to FIG. 1, the electronic device 100 includes a communication unit 110, a user input unit 120, an output unit 150, a memory 160, an interface unit 170, a control unit 180, and a power supply unit 190. The components shown in FIG. 1 may be components that may be commonly included in an electronic device. Accordingly, more or less components may be included in the electronic device 100.

The communication unit 110 may include one or more modules that enable communication between the electronic device 100 and a communication system or between the electronic device 100 and another device. For instance, the communication unit 110 may include a broadcast receiving unit 111, an Internet module 113, and a near-field communication module 114.

The broadcast receiving unit 111 receives broadcast signals and/or broadcast-related information from an external broadcast managing server through a broadcast channel.

The broadcast channel may include a satellite channel and a terrestrial channel. The broadcast managing server may refer to a server that generates broadcast signals and/or broadcast-related information and broadcasts the signals and/or information or a server that receives pre-generated broadcast signals and/or broadcast-related information and broadcasts the signals and/or information to a terminal. The broadcast signals may include TV broadcast signals, radio broadcast signals, data broadcast signals as well as combinations of TV broadcast signals or radio broadcast signals and data broadcast signals.

The broadcast-related information may refer to information relating to broadcast channels, broadcast programs, or broadcast service providers. The broadcast-related information may be provided through a communication network.

The broadcast-related information may exist in various forms, such as, for example, EPGs (Electronic Program Guides) of DMB (Digital Multimedia Broadcasting) or ESGs (Electronic Service Guides) of DVB-H (Digital Video Broadcast-Handheld).

The broadcast receiving unit 111 may receive broadcast signals using various broadcast systems. Broadcast signals and/or broadcast-related information received through the broadcast receiving unit 111 may be stored in the memory 160.

The Internet module 113 may refer to a module for access to the Internet. The Internet module 113 may be provided inside or outside the electronic device 100.

The near-field communication module 114 refers to a module for near-field communication. Near-field communication technologies may include Bluetooth, RFID (Radio Frequency Identification), IrDA (Infrared Data Association), UWB (Ultra Wideband), and ZigBee technologies.

The user input unit 120 is provided for a user's entry of audio or video signals and may include a camera 121 and a microphone 122.

The camera 121 processes image frames including still images or videos as obtained by an image sensor in a video call mode or image capturing mode. The processed image frames may be displayed by the display unit 151. The camera 121 may perform 2D or 3D image capturing or may be configured as one or a combination of 2D and 3D cameras.

The image frames processed by the camera 121 may be stored in the memory 160 or may be transmitted to an outside device through the communication unit 110. According to an embodiment, two or more cameras 121 may be included in the electronic device 100.

The microphone 122 receives external sound signals in a call mode, recording mode, or voice recognition mode and processes the received signals as electrical voice data. The microphone 122 may perform various noise cancelling algorithms to remove noises created when receiving the external sound signals. A user may input various voice commands through the microphone 122 to the electronic device 100 to drive the electronic device 100 and to perform functions of the electronic device 100.

The output unit 150 may include a display unit 151 and a sound output unit 152.

The display unit 151 displays information processed by the electronic device 100. For example, the display unit 151 displays a UI (User Interface) or GUI (Graphic User Interface) associated with the electronic device 100. The display unit 151 may be at least one of a liquid crystal display, a thin film transistor liquid crystal display, an organic light emitting diode display, a flexible display, and a 3D display. The display unit 151 may be configured in a transparent or light transmissive type, which may be called a "transparent display" examples of which include transparent LCDs. The display unit 151 may have a light-transmissive rear structure in which a user may view an object positioned behind the terminal body through an area occupied by the display unit 151 in the terminal body.

According to an embodiment, two or more display units 151 may be included in the electronic device 100. For instance, the electronic device 100 may include a plurality of display units 151 that are integrally or separately arranged on a surface of the electronic device 100 or on respective different surfaces of the electronic device 100.

When the display unit 151 and a sensor sensing a touch (hereinafter, referred to as a "touch sensor") are layered (this layered structure is hereinafter referred to as a "touch sensor"), the display unit 151 may be used as an input device as well as an output device. The touch sensor may include, for example, a touch film, a touch sheet, or a touch pad.

The touch sensor may be configured to convert a change in pressure or capacitance, which occurs at a certain area of the display unit 151, into an electrical input signal. The touch sensor may be configured to detect the pressure exerted during a touch as well as the position or area of the touch.

Upon touch on the touch sensor, a corresponding signal is transferred to a touch controller. The touch controller processes the signal to generate corresponding data and transmits the data to the control unit 180. By doing so, the control unit 180 may recognize the area of the display unit 151 where the touch occurred.

The sound output unit 152 may output audio data received from the communication unit 110 or stored in the memory 160. The sound output unit 152 may output sound signals associated with functions (e.g., call signal receipt sound, message receipt sound, etc.) performed by the electronic device 100. The sound output unit 152 may include a receiver, a speaker, and a buzzer.

The memory 160 may store a program for operation of the control unit 180, and may preliminarily store input/output data (for instance, phone books, messages, still images, videos, etc.). The memory 160 may store data relating to vibrations and sounds having various patterns, which are output when the touch screen is touched.

The memory 160 may include at least one storage medium of flash memory types, hard disk types, multimedia card micro types, card type memories (e.g., SD or XD memories), RAMS (Random Access Memories), SRAM (Static Random Access Memories), ROMs (Read-Only Memories), EEPROMs (Electrically Erasable Programmable Read-Only Memories), PROM (Programmable Read-Only Memories), magnetic memories, magnetic discs, and optical discs. The electronic device 100 may operate in association with a web storage performing a storage function of the memory 160 over the Internet.

The interface unit 170 functions as a path between the electronic device 100 and any external device connected to the electronic device 100. The interface unit 170 receives data or power from an external device and transfers the data or power to each component of the electronic device 100 or enables data to be transferred from the electronic device 100 to the external device. For instance, the interface unit 170 may include a wired/wireless headset port, an external recharger port, a wired/wireless data port, a memory card port, a port connecting a device having an identification module, an audio I/O (Input/Output) port, a video I/O port, and an earphone port.

The control unit 180 controls the overall operation of the electronic device 100. For example, the control unit 180 performs control and processes associated with voice call, data communication, and video call. The control unit 180 may include an image processing unit 182 for image process. The image processing unit 182 is described below in relevant parts in greater detail.

The power supply unit 190 receives internal or external power under control of the control unit 180 and supplies the power to each component for operation of the component.

The embodiments described herein may be implemented in software or hardware or in a combination thereof, or in a recording medium readable by a computer or a similar device to the computer. When implemented in hardware, the embodiments may use at least one of ASICs (application specific integrated circuits), DSPs (digital signal processors), DSPDs (digital signal processing devices), PLDs (programmable logic devices), FPGAs (field programmable gate arrays, processors, controllers, micro-controllers, microprocessors, and electrical units for performing functions. According to an embodiment, the embodiments may be implemented by the control unit 180.

When implemented in software, some embodiments, such as procedures or functions, may entail a separate software module for enabling at least one function or operation. Software codes may be implemented by a software application written in proper programming language. The software codes may be stored in the memory 160 and may be executed by the control unit 180.

Figure 2:
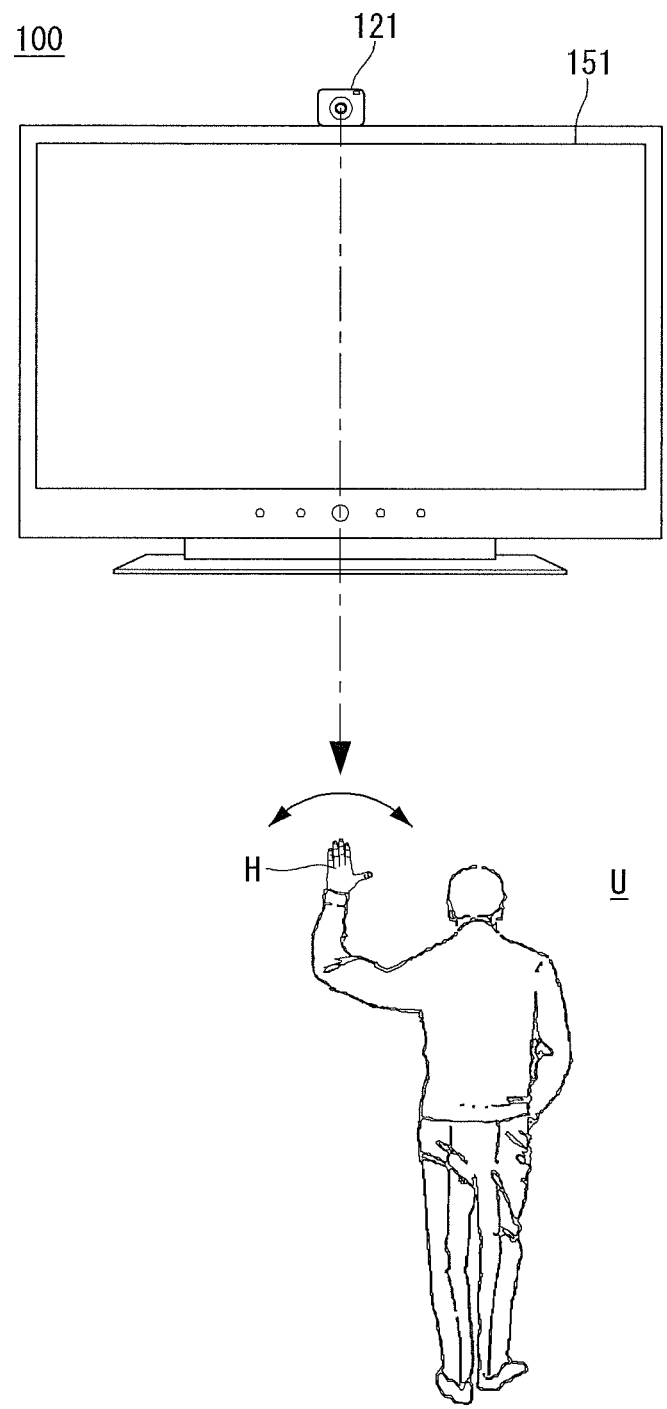
FIG. 2 is a view illustrating an example where a user inputs a gesture to an electronic device as shown in FIG. 1.

FIG. 2 is a view illustrating an example where a user inputs a gesture to an electronic device as shown in FIG. 1.

Referring to FIG. 2, the electronic device 100 may capture the gesture of the user U and may perform a proper function corresponding to the gesture.

The electronic device 100 may be any electronic device having the display unit 151 that can display images. The electronic device 100 may be a stationary terminal, such as a TV shown in FIG. 2, which is bulky and thus placed in a fixed position, or may be a mobile terminal such as a cell phone. The electronic device 100 may include the camera 121 that may capture the gesture of the user U.

The camera 121 may be an optical electronic device that performs image capturing in a front direction of the electronic device 100. The camera 121 may be a 2D camera for 2D image capturing and/or a 3D camera for 3D image capturing. Although in FIG. 2 one camera 121 is provided at a top central portion of the electronic device 100 for ease of description, the number, location, and type of the camera 121 may vary as necessary.

The control unit 180 may trace a user U having a control right when discovering the user U. The issue and trace of the control right may be performed based on an image captured by the camera 121. For example, the control unit 180 may analyze a captured image and continuously determine whether there a specific user U exists, whether the specific user U performs a gesture necessary for obtaining the control right, and whether the specific user U moves or not.

The control unit 180 may analyze a gesture of a user having the control right based on a captured image. For example, when the user U makes a predetermined gesture but does not own the control right, no function may be conducted. However, when the user U has the control right, a predetermined function corresponding to the predetermined gesture may be conducted.

The gesture of the user U may include various operations using his/her body. For example, the gesture may include the operation of the user sitting down, standing up, running, or even moving. Further, the gesture may include operations using the user's head, foot, or hand H. For convenience of illustration, a gesture of using the hand H of the user U is described below as an example. However, the embodiments of the present invention are not limited thereto.

According to an embodiment, analysis of a hand gesture may be conducted in the following ways.

First, the user's fingertips are detected, the number and shape of the fingertips are analyzed, and then converted into a gesture command.

The detection of the fingertips may be performed in two steps.

First, a step of detecting a hand area may be performed using a skin tone of a human. A group of candidates for the hand area is designated and contours of the candidates are extracted based on the human's skin tone. Among the candidates, a candidate the contour of which has the same number of points as a value in a predetermined range may be selected as the hand.

Secondly, as a step of determining the fingertips, the contour of the candidate selected as the hand is run around and a curvature is calculated based on inner products between adjacent points. Since the fingertips show sharp variation of their curvatures, when a change in a curvature of a fingertip exceeds a threshold value, the fingertip is chosen as a fingertip of the hand. The fingertips thusly extracted may be converted into meaningful commands during gesture-command conversion.

According to an embodiment, it is often necessary with respect to a gesture command for a synthesized virtual 3D image (3D object) to judge whether a contact has occurred between the virtual 3D image and a user's gesture. For example, it may be necessary, as is often case, whether there is a contact between an actual object and a virtual object to manipulate the virtual object interposed in the actual object.

Whether the contact is present or not may be determined by various collision detection algorithms. For instance, a rectangle bounding box method and a bounding sphere method may be adopted for such judgment.

The rectangle bounding box method compares areas of rectangles surrounding a 2D object for collision detection. The rectangle bounding box method has merits such as being less burden in calculation and easy to follow. The bounding sphere method determines whether there is collision or not by comparing radii of spheres surrounding a 3D object.

For example, a depth camera may be used for manipulation of a real hand and a virtual object. Depth information of the hand as obtained by the depth camera is converted into a distance unit for a virtual world for purposes of rendering of the virtual image, and collision with the virtual object may be detected based on a coordinate.

Hereinafter, an exemplary environment in which the embodiments of the present invention are implemented is described. FIG. 3 is a view for describing an environment according to an embodiment of the present invention.

Referring to FIG. 3, a first user U1 and a second user U2 are positioned in a first place and a second place, respectively. The first user U1 may be a person who hosts a teleconference and/or provides lectures to a number of other people including the second user U2, and the second user U2 may be a person who attends the teleconference hosted by the first user U1.

A voice and/or motion of the first user U1 may be obtained and converted into video data and/or audio data by an electronic device 200 arranged in the first place. Further, the video data and/or audio data may be transferred through a predetermined network (communication network) to another electronic device 300 positioned in the second place. The first electronic device 300 may output the transferred video data and/or audio data through an output unit in a visual or auditory manner. The first electronic device 200 and the first electronic device 300 each may be the same or substantially the same as the electronic device 100 described in connection with FIG. 1. However, according to an embodiment, each of the first electronic device 200 and the first electronic device 300 may include only some of the components of the electronic device 100. According to an embodiment, the components of the first electronic device 200 may be different from the components of the first electronic device 300.

FIG. 3 illustrates an example where the first electronic device 200 obtains and transfers the video data and/or audio data and the first electronic device 300 outputs the transferred video data and/or audio data. According to an embodiment, the first electronic device 200 and the first electronic device 300 may switch to each other in light of functions and operations, or alternatively, each of the first electronic device 200 and the first electronic device 300 may perform the whole functions described above.

For example, the first user U1 may transfer his image and/or voice through the first electronic device 200 to the first electronic device 300 and may receive and output an image and/or voice of the second user U2. Likewise, the first electronic device 300 may also perform the same functions and operations as the first electronic device 200.

Hereinafter, an operation of an electronic device according to an embodiment of the present invention is described. For purposes of illustration, the operation is performed by an electronic device having the same configuration as the electronic device 100 described in connection with FIG. 1. As used herein, a "first electronic device" refers to the first electronic device 200 shown in FIG. 3, which is arranged in the first place, and a "second electronic device" refers to the first electronic device 300 shown in FIG. 3, which is arranged in the second place. However, the embodiments of the present invention are not limited thereto.

Figure 4:
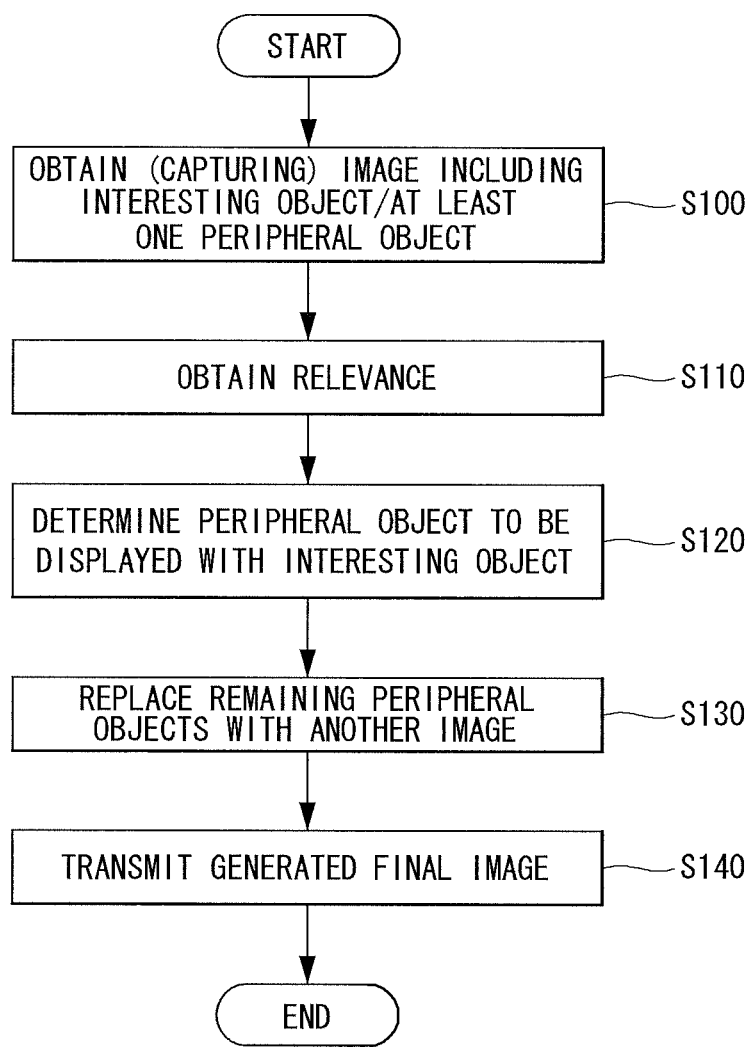
FIG. 4 is a flowchart for describing a method of operating an electronic device according to an embodiment of the present invention.

FIG. 4 is a flowchart for describing a method of operating an electronic device according to an embodiment of the present invention.

Referring to FIG. 4, the method of operating an electronic device includes a step S100 of obtaining a first image including a interesting object and at least one peripheral object, a step S110 of obtaining relevance of the at least one peripheral object for the interesting object based on at least one of attributes including a state, a motion, and a location of the interesting object, a step S120 of determining a specific peripheral object according to the relevance, a step S130 of replacing an area of the whole first image, which is occupied by the remaining peripheral objects other than the specific peripheral object and the interesting object, with another image and generating a second image, and a step S140 of transmitting the second image to the first electronic device 300. Hereinafter, each step is described in greater detail.

The first electronic device 200 may obtain a first image IM1 including an interesting object IOB and at least one peripheral object POB (S100). For instance, the control unit 180 controls the camera 121 to obtain the first image IM1 including a plurality of objects including the first user U1. The first image IM1 may include a video obtained by capturing the first user U1 and a periphery of the user U1.

The interesting object IOB may refer to an object determined to be most important in the obtained first image IM1, and may include the first user U1.

The peripheral object POB may refer to the whole objects except for the interesting object IOB in the first image IM1, and may include a desk D and a board B arranged in the first place and a wall W partitioning the first place.

Figure 5:
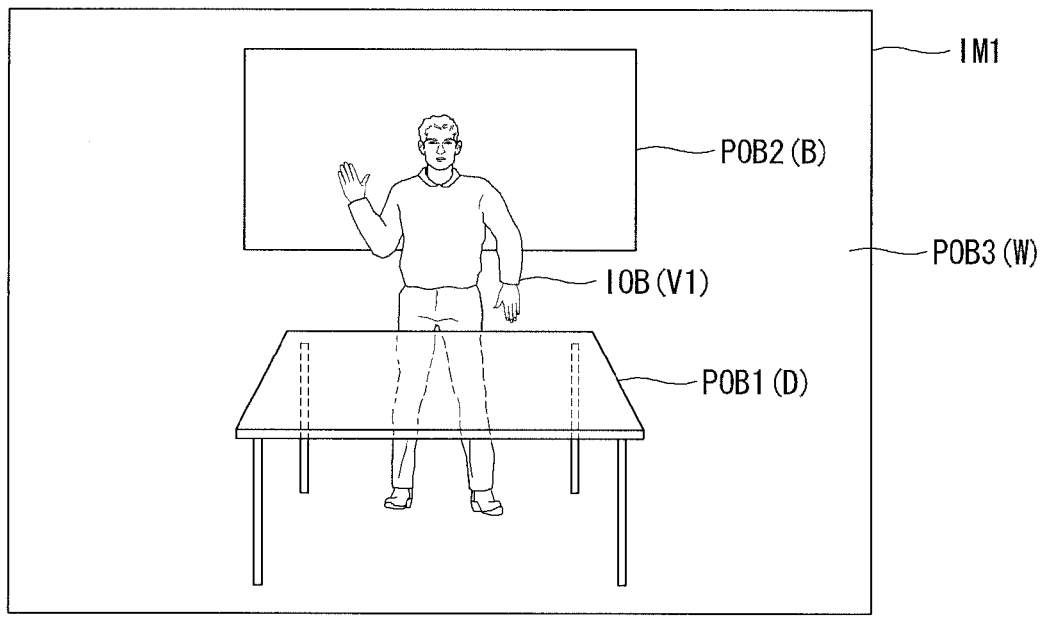
FIG. 5 is a view for describing a first image obtained according to an embodiment of the present invention.

FIG. 5 is a view for describing a first image obtained according to an embodiment of the present invention. FIG. 5 illustrates the first image IM1 including an interesting object IOB that is the first user U1 shown in FIG. 3 and peripheral objects POB1, POB2, and POB3 that are the desk D, the board B, and the wall W, respectively, as shown in FIG. 3.

For purposes of illustration, as shown in FIG. 5, the interesting object hereinafter refers to the first user U1. However, the interesting object is not limited to the first user U1, and according to an embodiment, other objects, such as the board B, may be set as the interesting object. For instance, when the first user U1 intends to project data necessary for a meeting onto the board B or to take notes while hosting the meeting in an environment as shown in FIG. 3, the board B may be set as the interesting board.

The first electronic device 200 may obtain relevance of the at least one peripheral object POB for the interesting object IOB based on at least one of attributes including a state, a motion, and a location of the interesting object IOB (S110).

The first electronic device 200 may obtain, through the control unit 180, information on attributes of the interesting object IOB by analyzing the obtained first image IM1 (S110). The control unit 180 may analyze the obtained first image using an image processing technology to obtain the attribute information on the interesting object U1. In the case that the camera 121 is a 3D camera, the control unit 180 may obtain the attribute information on the interesting object by analyzing depth information on the interesting object U1 obtained by the camera 121. A specific method of the first electronic device 200 obtaining the attribute information on the interesting object is described below.

The first electronic device 200 may obtain relevance of the at least one peripheral object POB with respect to the interesting object IOB based on the attribute information on the obtained interesting object (S110). The "relevance" refers to information on how much each peripheral object POB is related to the interesting object IOB. The relevance may be designed to have two options, such as "Related" and "Not-related", or may be designed to have more detailed, graded options. The relevance may be defined to have relative values with respect to each peripheral object rather than to have absolute values. For instance, the relevance may be defined in such a manner that "the relevance of the first peripheral object is higher than the relevance of the second peripheral object."

Referring to FIGS. 6 to 10, a method is specifically described that analyzes the obtained first image IM1 to obtain attribute information on the interesting object IOB, thereby obtaining relevance of the peripheral object POB with respect to the interesting object IOB.

FIGS. 6 to 10 are views for describing a method of obtaining relevance of a peripheral object for an interesting object based on an attribute of the interesting object according to an embodiment of the present invention.

The first electronic device 200 may obtain and analyze various attributes of the interesting object IOB and obtain relevance.

First, the first electronic device 200 may obtain a location attribute of the interesting object IOB and obtain the relevance based on the location attribute.

Figure 6:
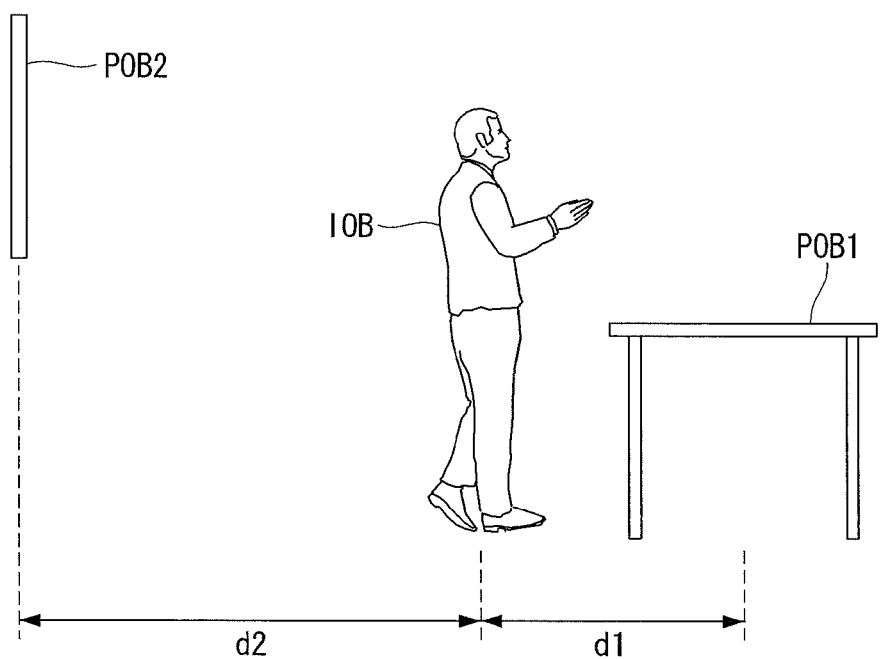
FIGS. 6 to 10 are views for describing a method of obtaining relevance of a peripheral object for an interesting object based on an attribute of the interesting object according to an embodiment of the present invention.
Figure 7:
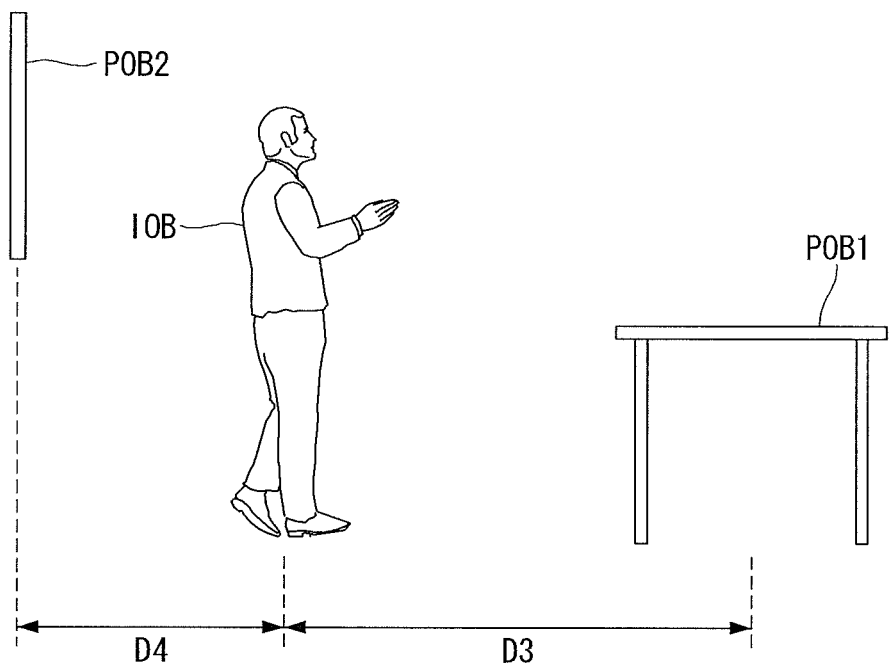

For instance, as shown in FIGS. 6 and 7, the first electronic device 200 may obtain a depth value of the interesting object IOB through the camera 121 which is a 3D camera. When obtaining the location attribute of the interesting object IOB, the first electronic device 200 may also obtain depth values of other peripheral objects POB1 and POB2 included in the first image IM1.

Based on the obtained depth values, the first electronic device 200 may calculate a difference in distance between the interesting object IOB and each peripheral object POB1 or POB2. FIG. 6 illustrates an example where a distance d1 between the interesting object IOB and the first peripheral object POB1 is shorter than a distance d2 between the interesting object IOB and the second peripheral object POB2, and FIG. 7 illustrates an example where a distance d3 between the interesting object IOB and the first peripheral object POB1 is longer than a distance d4 between the interesting object IOB and the second peripheral object POB2.

The first electronic device 200 may allocate higher relevance to a peripheral object located closer to the interesting object IOB. For instance, in the example as shown in FIG. 6, the first electronic device 200 may allocate higher relevance to the first object POB1 and lower relevance to the second object POB2, and in the example as shown in FIG. 7, the first electronic device 200 may allocate higher relevance to the second object POB2.

Secondly, the first electronic device 200 may obtain a state attribute on the interesting object IOB and obtain the relevance based on the state attribute.

Figure 8:
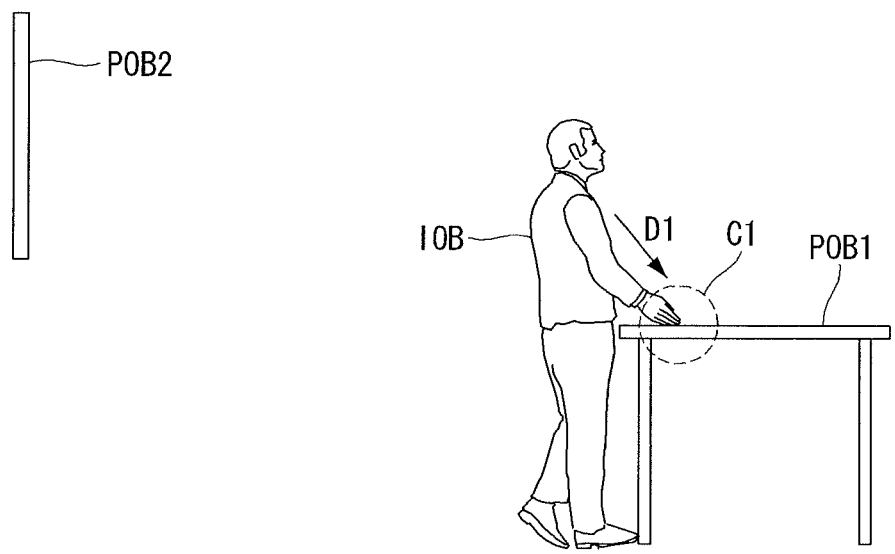
Figure 9:
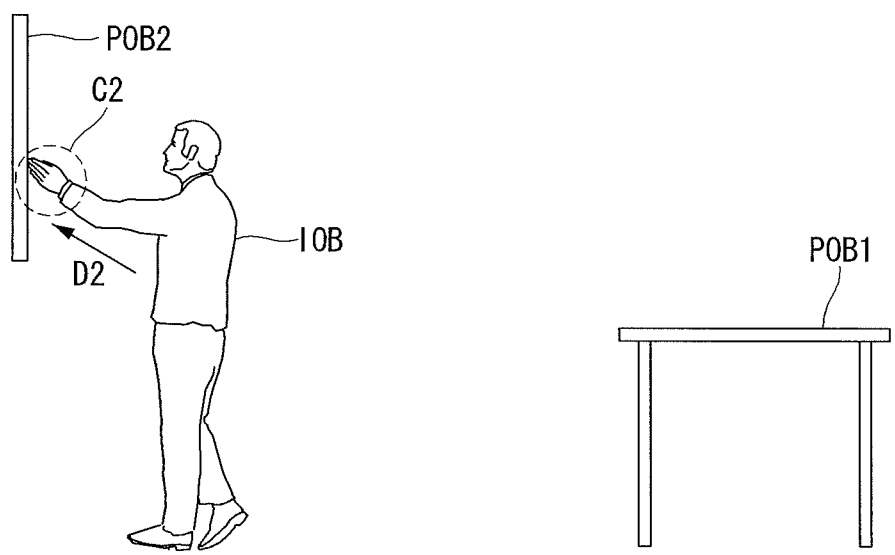

For instance, as shown in FIGS. 8 and 9, the first electronic device 200 may obtain information on a state of the interesting object IOB by analyzing the first image IM1 obtained through the camera 121.

According to an embodiment, the state attribute of the interesting object IOB may be defined by various methods.

For instance, the state attribute of the interesting object IOB may be defined based on a physical contact state with other peripheral objects POB.

FIG. 8 illustrates a state where part (for example, the first user's hand) of the interesting object IOB contacts the first peripheral object POB1 (C1), and FIG. 9 illustrates a state where part of the interesting object IOB contacts the second peripheral object POB2 (C2).

The first electronic device 200 may allocate higher relevance to a peripheral object contacting the interesting object IB. For example, in the example as shown in FIG. 8, the first electronic device 200 may assign higher relevance to the first peripheral object POB1 than the second peripheral object POB2, and in the example as shown in FIG. 9 the first electronic device 200 may allocate higher relevance to the second peripheral object POB2 than the first peripheral object POB1.

According to an embodiment, the state attribute of the interesting object IOB may be defined based on orientation of a specific part of the interesting object IOB toward other peripheral objects POB.

FIG. 8 illustrates a state where part (for example, the first user's arm) of the interesting object IOB extends in a direction (D1) toward the first peripheral object POB1, and FIG. 9 illustrates a state where part of the interesting object IOB extends in a direction (D2) toward the second peripheral object POB2.

The first electronic device 200 may allocate higher relevance to a peripheral object to which the interesting object IOB or at least part of the interesting object IOB is oriented. For example, in the example as shown in FIG. 8, the first electronic device 200 may allocate higher relevance to the first peripheral object POB1 than the second peripheral object POB2, and in the example as shown in FIG. 9 the first electronic device 200 may allocate higher relevance to the second peripheral object POB2 than the first peripheral object POB1.

According to an embodiment, in the case that the interesting object IOB is a human, such as the first user U1, the state attribute of the interesting object IOB may be defined based on the direction of the first user's view.

For example, according to an embodiment, the first user's view is oriented toward the first peripheral object POB1, the first electronic device 200 may allocate higher relevance to the first peripheral object POB1 than the second peripheral object POB2. According to an embodiment, in the case that the first user's view is oriented toward the second peripheral object POB2, the first electronic device 200 may allocate higher relevance to the second peripheral object POB2.

Third, the first electronic device 200 may obtain a motion attribute on the interesting object IOB and obtain the relevance based on the motion attribute.

For instance, the first electronic device 200 may obtain information on a motion of the interesting object IOB by analyzing the first image IM1 obtained through the camera 121.

While obtaining the information on the motion of the interesting object IOB, the first electronic device 200 may analyze directivity of the motion. The first electronic device 200 may analyze the directivity of a movement of the whole or part of the interesting object IOB.

Figure 10:
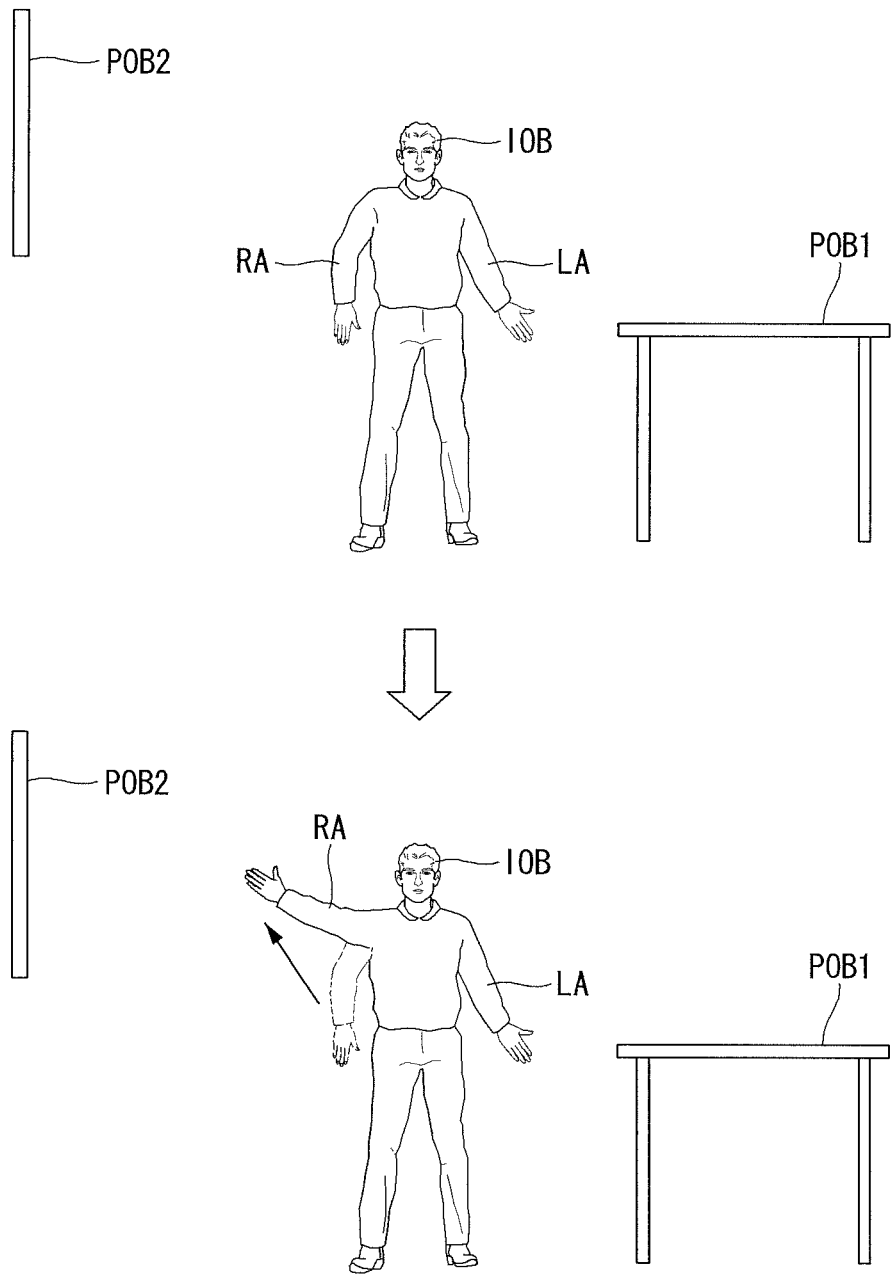

FIG. 10 illustrates an example where at least part (for example, the first user's right arm RA) of the interesting object IOB moves and the first electronic device 200 may analyze a direction in which the part RA off the interesting object IOB moves.

The first electronic device 200 may allocate higher relevance to a peripheral object that is located over a direction (motion direction) in which the interesting object IOB or at least part of the interesting object IOB moves. For example, since in the example as shown in FIG. 10 the second peripheral object POB2 is located over a direction (motion direction) in which the right hand RA of the interesting object IOB moves, the first electronic device 200 may allocate higher relevance to the second peripheral object POB2 than the first peripheral object POB1.

Referring back to FIG. 4, the first electronic device 200 may select a specific peripheral object according to the relevance (S120).

In step S120, the first electronic device 200 may select a peripheral object having higher relevance between the peripheral objects POB1 and POB2. For instance, in the example described in connection with FIGS. 6 and 8, the first peripheral object POB1 may be selected as the specific object, and in the example described in connection with FIGS. 7, 9, and 10, the second peripheral object POB2 may be selected as the specific object.

According to an embodiment, in step S120, the first electronic device 200 may select one or two specific objects of the plurality of peripheral objects POB1 and POB2, or according to an embodiment, the first electronic device 200 may select two or more specific objects.

For instance, when the first user U1 that is the interesting object IOB contacts the first peripheral object POB1 as shown in FIG. 8 and then the first user U1 contacts the second peripheral object POB2 as shown in FIG. 9, the first and second peripheral objects may be both selected as the specific objects.

According to an embodiment, when the first user's view is oriented toward the second peripheral object POB2 and the first user's hand contacts the first peripheral object POB1, the first and second peripheral objects POB1 and POB2 both may be selected as the specific peripheral objects.

According to an embodiment, when the first user's hand contacts the first peripheral object POB1 and the other hand of the first user U1 is oriented toward the second peripheral object POB2, the first and second peripheral objects POB1 and POB2 may be both selected as the specific peripheral objects.

According to an embodiment, two or more peripheral objects may be selected as the specific peripheral objects based on various combinations.

Subsequently, the first electronic device 200 may replace areas occupied by the other remaining peripheral objects than the specific peripheral object and the interesting object IOB in the whole area of the first image IM1 with another image (S130).

Figure 11:
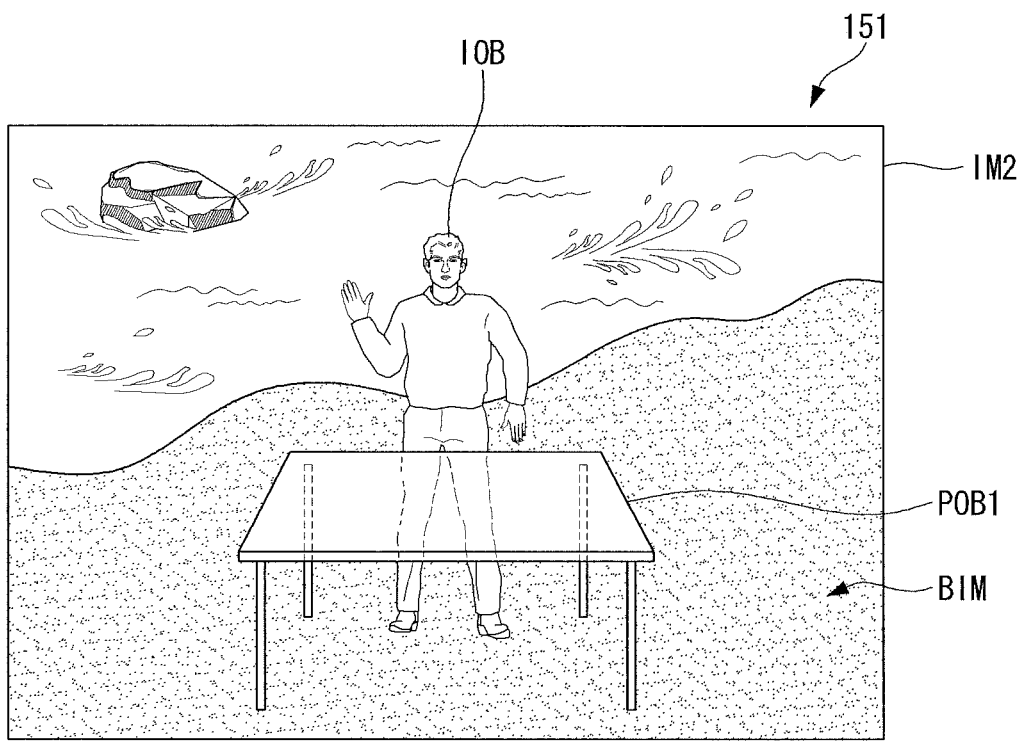
FIGS. 11 and 12 are views each illustrating a second image in which an area occupied by the remaining objects is replaced with another image according to an embodiment of the present invention.
Figure 12:
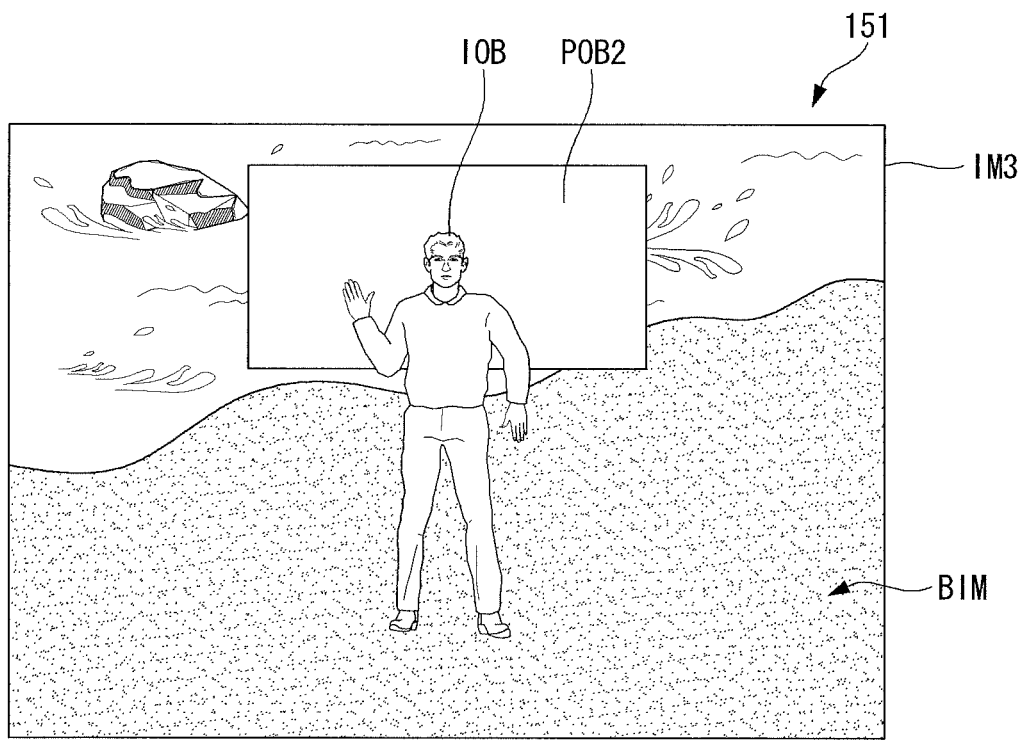

FIGS. 11 and 12 are views each illustrating a second image in which an area occupied by the remaining objects is replaced with another image according to an embodiment of the present invention.

FIG. 11 illustrates an example where the first peripheral object POB1 is selected as a specific object. As described in connection with FIGS. 6 and 8, in the case that the first peripheral object POB1 is selected as the specific object, the interesting object IOB and the first peripheral object POB1 are maintained, as is, in the first image IM1, but the remaining peripheral objects POB2 and POB3 are replaced by another image, for example, a wavy sea image as shown in FIG. 11.

FIG. 12 illustrates an example where the second peripheral object POB2 is selected as a specific object. As described in connection with FIGS. 7, 9, and 10, in the case that the second peripheral object POB2 is selected as the specific object, the interesting object IOB and the second peripheral object POB2 are maintained, as is, in the first image IM1, but the remaining peripheral objects POB1 and POB3 are replaced by another image, for example, a wavy sea image as shown in FIG. 11.

The first electronic device 200 may transmit the second image generated in steps S100 to S130 to the first electronic device 300 (S140).

By doing so, the first user U1 who hosts a meeting and/or provides a distance lecture through the first electronic device 200 may transmit an image including only his desired objects (for example, his own and specific peripheral objects) among objects in the first place where the first user has the meeting to the first electronic device 300 used by another user (for example, the second user). In particular, since the specific peripheral objects desired to be displayed may be selected without any complicated procedures, the first user may smoothly perform, e.g., a teleconference.

Although it has been described above that the relevance of the peripheral objects POB is obtained based on various attributes such as location and/or motion of the interesting object IOB included in the obtained first image IM1 and specific peripheral objects to be displayed together with the interesting object IOB are selected according to the obtained relevance, the embodiments of the present invention are not limited thereto. According to an embodiment, the first user U1 may also select the specific peripheral objects by directly selecting the specific peripheral objects in the first image IM1. Hereinafter, a method of selecting the specific objects is described.

Figure 13:
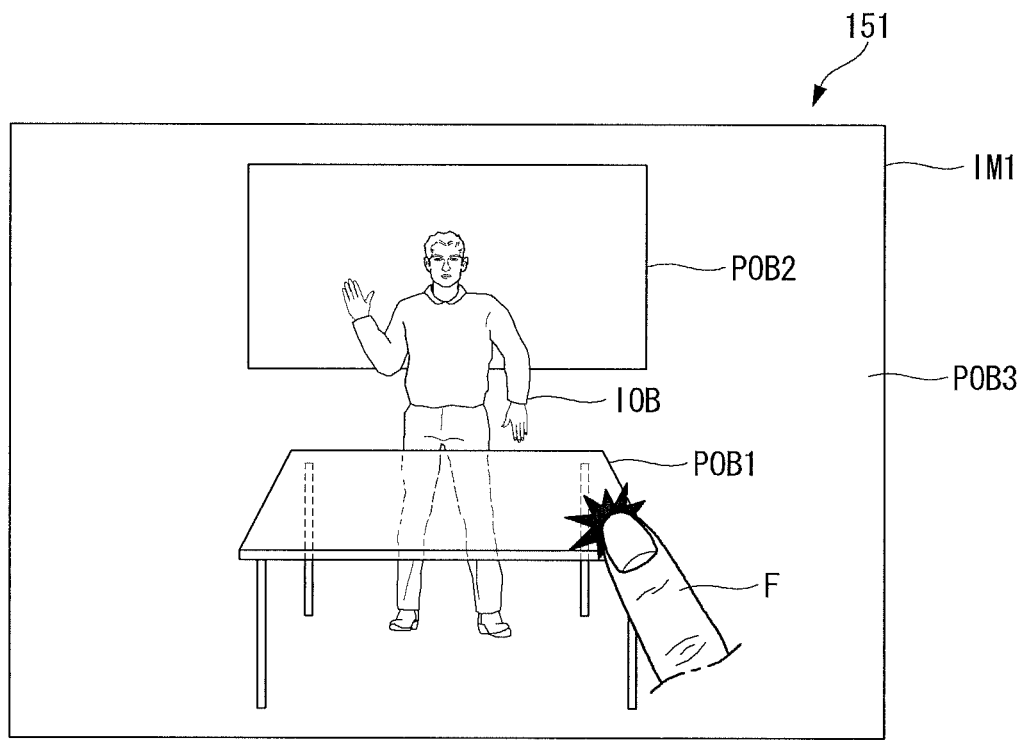
FIGS. 13 and 14 are views for describing a method of selecting a specific object according to an embodiment of the present invention.
Figure 14:
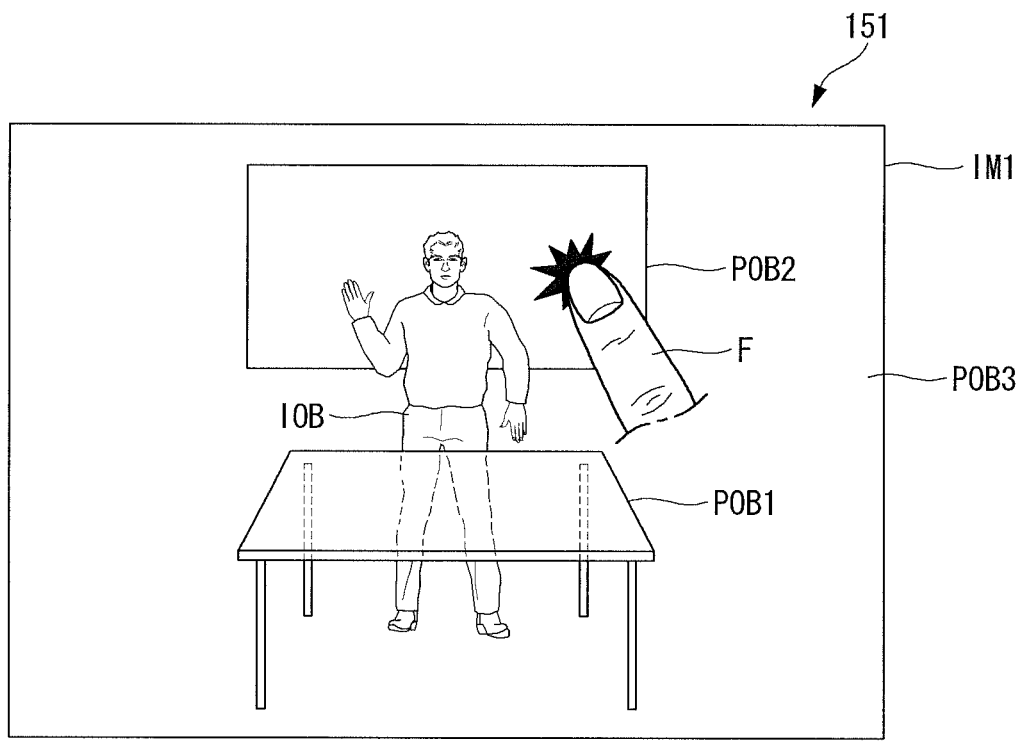

FIGS. 13 and 14 are views for describing a method of selecting a specific object according to an embodiment of the present invention.

As shown in FIGS. 13 and 14, the first electronic device 200 may display the obtained first image IM1 on the display unit 151 provided in the first electronic device 200 or connected to the first electronic device 200 and may select the specific object according to the first user's selective entry on the first image IM1.

FIG. 13 illustrates an example where the first peripheral object POB1 is selected as the specific object by the first user's touch input using his finger F, and FIG. 14 illustrates an example where the second peripheral object POB2 is selected as the specific object by a touch on the second peripheral object POB2.

Although in FIGS. 13 and 14, the first user's selective entry for selection of the specific object is a touch input, the selective entry for selecting the specific object is not limited to the touch input and other input methods, such as entry using, for example, a mouse, a keyboard, a gesture, or a voice command, may be also used for the selective entry.

According to an embodiment, the first user's selective entry may be performed on the obtained first image without performing the steps S110 to S120 or after performing the steps S110 to S120.

When the first user's selective entry is performed after performing the steps S110 and S120, the first image IM1 displayed on the display unit 151 and viewed by the first user U1 may reflect information on the specific peripheral object determined through the steps S110 and S120. Various methods may be used that reflect the information on the specific object and displays the first image IM1.

For example, the selected specific object may be highlighted and displayed. According to an embodiment, the other remaining objects than the selected object may be blurred and displayed. For example, the first electronic device 200 may display the first image IM1 in such a way that the specific object selected through the steps S110 and S120 is different in display property than the remaining peripheral objects, so that information on the selected specific object may be reflected to the first image IM1.

According to an embodiment, another object, such as text and/or a symbol notifying that the specific object has been selected, may be displayed at a periphery of the selected specific object so that the information on the selected specific peripheral object may be reflected to the first image IM1.

Hereinafter, an operation of an electronic device according to an embodiment of the present invention is described. For purposes of illustration, the operation is performed by an electronic device having the same configuration as the electronic device 100 described in connection with FIG. 1. As used herein, a "first electronic device" refers to the first electronic device 200 shown in FIG. 3, which is arranged in the first place, and a "second electronic device" refers to the first electronic device 300 shown in FIG. 3, which is arranged in the second place. However, the embodiments of the present invention are not limited thereto.

Figure 15:
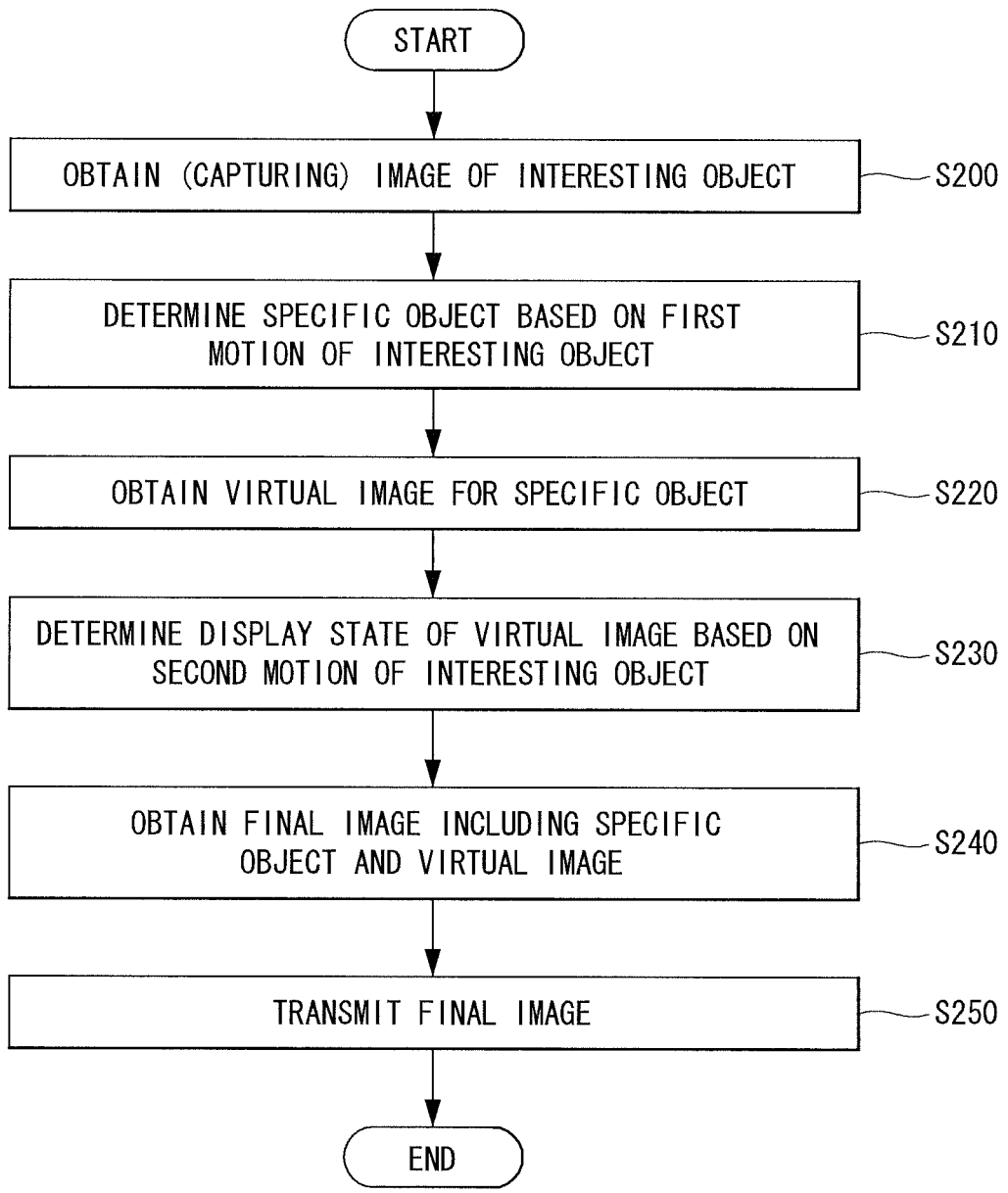
FIG. 15 is a flowchart for describing a method of operating an electronic device according to an embodiment of the present invention.

FIG. 15 is a flowchart for describing a method of operating an electronic device according to an embodiment of the present invention.

Referring to FIG. 15, the method of operating an electronic device includes a step S200 of obtaining a first image of an interesting image, a step S210 of determining a specific object based on a first motion of the interesting object, a step S220 of obtaining a virtual image corresponding to the specific object, a step S230 of determining a display state of the virtual image based on a second motion of the interesting object, a step S240 of obtaining a final image including the virtual image and at least part of the first image considering the determined display state, and a step S250 of transmitting the final image to the second electronic device. According to an embodiment, based on various motions of the first object (for example, the first user shown in FIG. 3), an virtual image for various data (for example, presentation materials) that may be referred to for performing a teleconference may be synthesized with the image that is to be transmitted to another user (for example, the second user shown in FIG. 3) and the synthesized image may be transmitted. Hereinafter, each step is described in greater detail.

Figure 16:
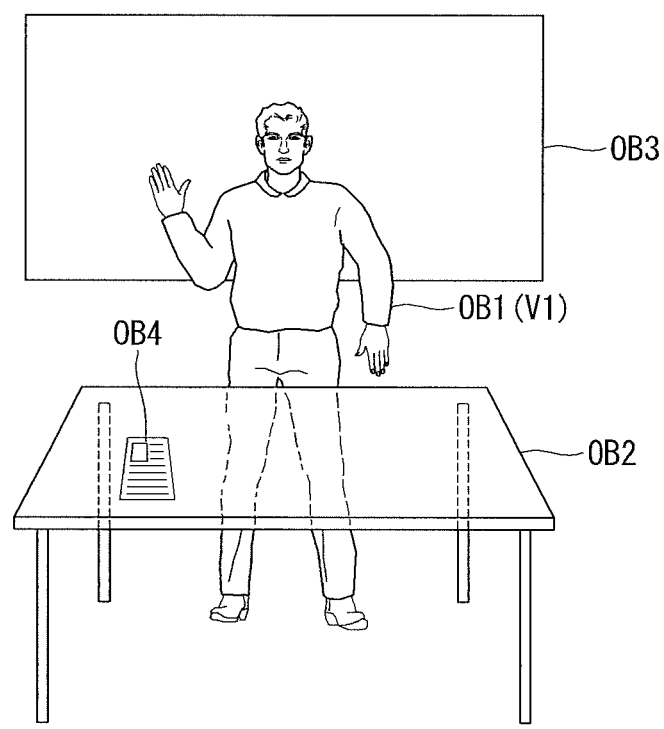
FIG. 16 is a view for describing a first place according to an embodiment of the present invention.

FIG. 16 is a view for describing a first place according to an embodiment of the present invention. Referring to FIG. 16, the first place includes a first object OB1 (U1) that hosts a teleconference, a second object OB2 that is a desk, a third object OB3 that is a board, and a fourth object OB4 that is a document on the second object OB2. For convenience of description, the first object OB1 that is a first user U1 is hereinafter referred to as an interesting object.

In the situation shown in FIG. 16, the first electronic device 200 may obtain a first image for the interesting object OB1 (S200). The first image may include a video, and the first image may include at least one of the second to fourth objects OB2, OB3, and OB4 as well as the image for the first object 031.

Subsequently, the interesting object OB1 may make a predetermined first motion. When obtaining the first motion, the first electronic device 200 may determine all and/or at least some of the second to fourth objects OB2, OB3, and OB4 as specific objects based on the first motion (S210). The predetermined first motion may vary and accordingly various methods may be used for determining the specific objects. The type of various first motions and a method of determining the specific objects based on the first motions are described below in greater detail.

The first electronic device 200 may obtain a virtual image for the specific object determined in step S210 (S220).

The virtual image may be obtained by separating only an image for the specific object from the first image.

According to an embodiment, the virtual image may be obtained from an image for the specific object obtained separately from the first image. For example, the first electronic device 200 may include two or more cameras 121. If the specific object is determined when the first image is obtained by a first camera of the cameras, an image for the specific object may be obtained by a second camera. The second camera may be a high-resolution camera designed to be able to obtain images having higher resolution than the first camera obtaining the first image.

The virtual image may be a 2D image for the specific object or a 3D image. In the case of obtaining the virtual image for the specific object as a 3D image, the following additional operations may be separately performed.

For instance, the specific object may be rotated by 360 degrees so that the interesting object (for example, the first user) may obtain a 3D virtual image for the selected specific object, and accordingly, the first electronic device 200 may obtain the 3D virtual image for the specific object through the camera 121. The specific object may be rotated by 360 degrees with respect to all of the three axes in a 3D orthogonal coordinates system.

According to an embodiment, when obtaining a virtual image for the interesting object, the 3D virtual image may be obtained using a plurality of images obtained based on images acquired by at least two or more cameras.

The first electronic device 200 may separately store the obtained virtual image in the memory 160 so that the virtual image may be used later.

Subsequently, the first electronic device 200 may determine a display state of the virtual image based on the second motion (S230). The display state may include a location where the virtual image is synthesized, and size, orientation, a rotational state, and a marking state of the virtual image. A method of determining the display state of the virtual image based on the second motion is specifically described below.

When in step S230 the display state of the virtual image is determined, the first electronic device 200 may obtain a final image including the first image and the virtual image in consideration of the determined display state (S240) and may transmit the final image to the first electronic device 300.

Hereinafter, referring to FIGS. 17 to 23, the type of first motions and a method of determining specific objects according to the first motions are specifically described.

FIGS. 17 to 23 are views for describing the type of first motions and a method of determining specific objects based on the first motions according to an embodiment of the present invention.

Firstly, a first motion may include a grip for a specific object.

Figure 17:
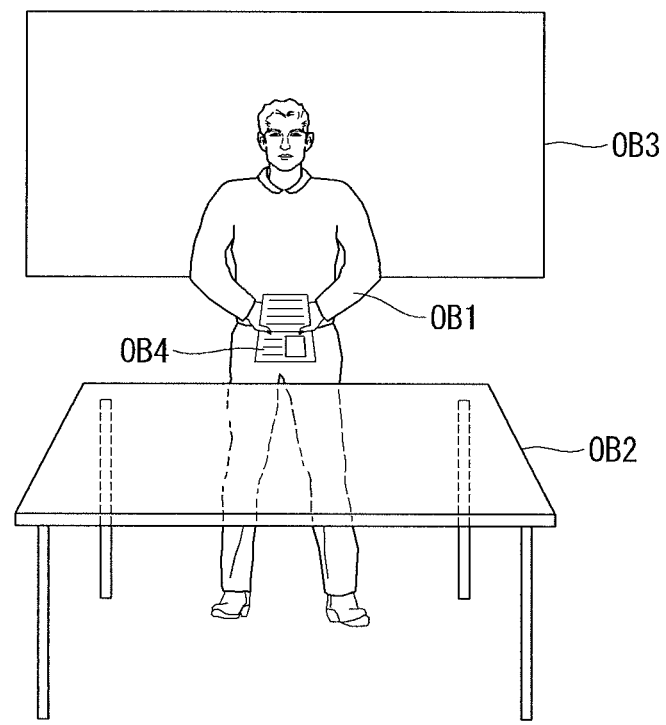

FIG. 17 illustrates an example where the interesting object OB1 grips the fourth object OB4. When the interesting object OB1 has a grip on the fourth object OB4, the first electronic device 200 determines the fourth object OB4 as the specific object and obtains and separately stores a virtual image for the fourth object OB4.

Figure 18:
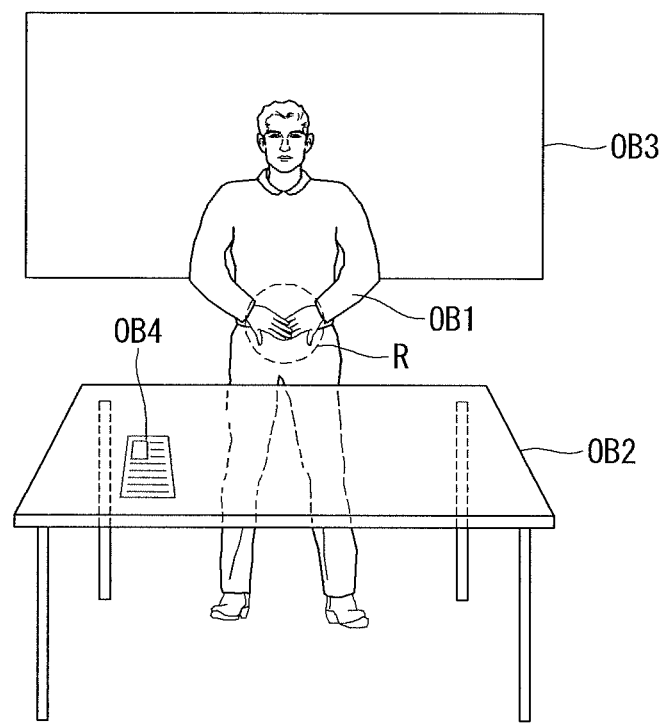

However, the first electronic device 200 analyzes a gesture of the interesting object OB1 to determine that the interesting object OB1 makes a predetermined first motion. When as shown in FIG. 18 it is determined that there is no object associated with the grip even when the interesting object OB1 is analyzed to makes a gesture corresponding to the grip—for example, no object is located between the two hands such as area R shown in FIG. 18), the first electronic device 200 disregards the gripping motion of the interesting object OB1.

For example, when obtaining the predetermined first motion, the first electronic device 200 may further analyze whether the predetermined first motion is associated with another object, and then only when the first motion is associated with the other object, the first electronic device 200 may determine the associated object as the specific object.

Referring to FIG. 19A, the interesting object OB1 located in the first place releases the grip on the fourth object OB4 to determine the specific object in step S210 and places the fourth object OB4 on the desk OB2.

Referring to FIG. 19B, even when the fourth object OB4 is not actually included in an image obtained through the camera 121, a virtual image VOB1 for the fourth object OB4 is synthesized and included in the final image FIM1 generated to be transmitted to the first electronic device 300.

Secondly, the first motion may be a motion for designating an area in the specific object—this motion may be simply referred to as an "area designating motion".

Figure 20:
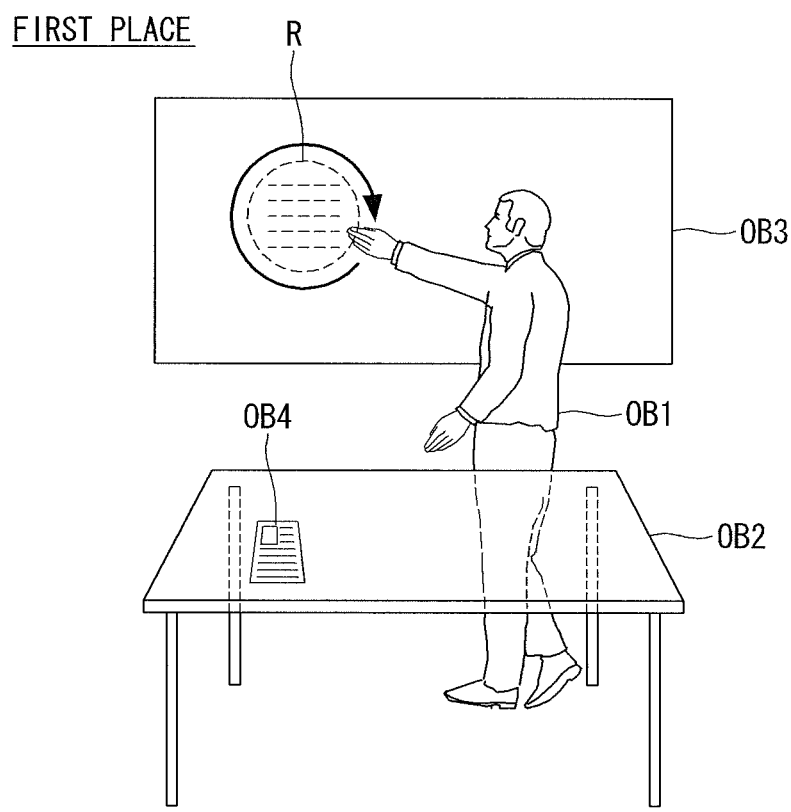

FIG. 20 illustrates an example where the interesting object OB1 makes a gesture of drawing a looped curve for an area R in the third object OB3. When the interesting object OB1 makes a motion for designating the area R in the third object OB3, the first electronic device 200 determines the area R as the specific object and obtains and separately stores a virtual image for the area R.

When it is determined that no object is associated with the motion for designating the area even when making a gesture corresponding to the area designating motion, the first electronic device 200 disregards the area designating motion of the interesting object OB1.

For instance, in the case that the interesting object OB1 makes the area designating motion while a hand and/or a finger of the object OB1 contacts the object or while the hand and/or finger is located within a predetermined distance of the object, the first electronic device 200 may determine that the area designating motion is associated with the object, and the first electronic device 200 may otherwise determine that the area designating motion is not associated with the object.

Referring to FIG. 21A, the interesting object OB1 located in the first place releases the area designating motion for the area R in the third object OB3 for determining the specific object in step S210 and performs a teleconference. Referring to FIG. 21B, even though the area R in the third object OB3 is not actually included in an image obtained through the camera 121, a virtual image VOB2 for the area R is synthesized and included in a final image FIM2 generated to be transmitted to the first electronic device 300.

Third, the first motion may be a tap on a specific object.

Figure 22:
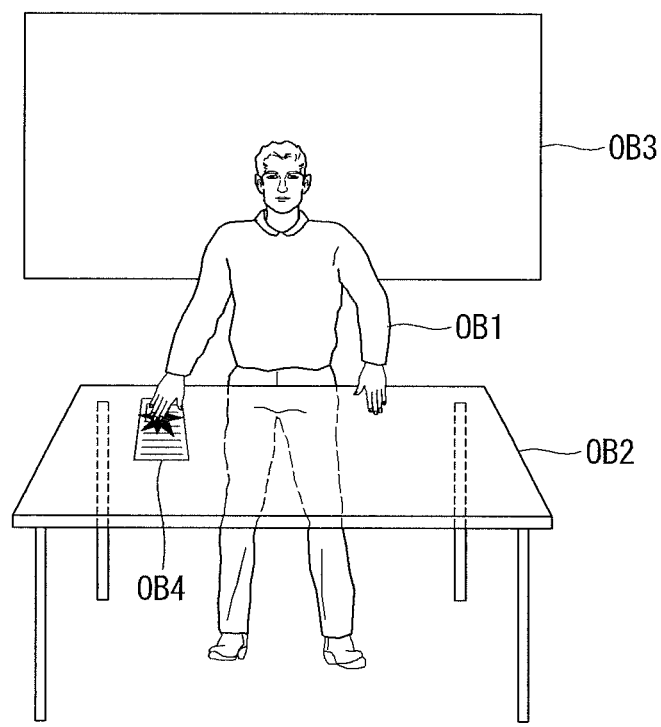

FIG. 22 illustrates an example where the interesting object OB1 makes a tapping gesture on the fourth object OB4. When the interesting object OB1 makes the tapping gesture on the object, the first electronic device 200 determines the fourth object OB4 as the specific object, obtains and separately stores a virtual image for the fourth object OB4. In the case that it is determined that there is no object associated with the tap even when it is analyzed that a gesture corresponding to the tap is made, the first electronic device 200 disregards the tap of the interesting object OB1. For instance, when the tapping gesture is made in the air, the first electronic device 200 may determine that there is no object associated with the tap and may disregard the tapping gesture.

Referring to FIG. 23A, the interesting object OB1 located in the first place releases the tapping motion for the fourth object OB4 for determining the specific object in step S210 and performs a teleconference. Referring to FIG. 23B, even when the fourth object OB4 is not actually included in an image obtained through the camera 121, a virtual image VOB3 for the fourth object OB4 may be synthesized and included in a final image FIM3 generated to be transmitted to the first electronic device 300.

The virtual image for the specific object obtained by the above-described method may be stored in the memory 160 separately from an image for the interesting object OB1 continuously obtained in real time.

The separately stored virtual image may be used for performing steps S230 and S240. Hereinafter, steps S230 and S240 are specifically described.

After determining the specific object by the above-described method and obtaining the virtual image for the specific object, the first electronic device 200 determines a state for displaying the virtual image to synthesize the virtual image with images continuously obtained in real time through the camera 121.

First, the first electronic device 200 may determine a location where the virtual image is to be displayed.

The first electronic device 200 may determine the location where to display the virtual image by various methods.

For instance, the first electronic device 200 may analyze an image obtained in real time and determine a location except for an area occupied by the interesting object OB1 as a location where to display the virtual image.

According to an embodiment, the first electronic device 200 may identify a specific sign (for example, a marker) from an image obtained through the camera 121 and may determine the location where to display the virtual image based on the location of the specific sign. For instance, the interesting object OB1 may place a specific sign at a location where to display the virtual image on the second object OB2, which is a desk. When the first electronic device 200, which previously stores an image for the specific sign, identifies the image for the sign, the first electronic device 200 may determine a location determined based on the sign as the location where to display the virtual image.

According to an embodiment, the first electronic device 200 may determine the location where to display the virtual image based on a gesture input of the interesting object OB1.

According to an embodiment, the first electronic device 200 may determine the location where to display the virtual image based on a direction in which the interesting object OB1 views.

The first electronic device 200 may continuously determine the location where to display the virtual image in real time. For example, the first electronic device 200 may once determine the location where to display the virtual image and may subsequently change the location where to display the virtual image rather than keeps displaying the virtual image at the determined location. For example, as the location of the interesting object OB1 varies in the obtained image, the location where to display the virtual image may keep changing. In the obtained image, as the location of the marker changes, the location where to display the virtual image may continue to change. As the gesture of the interesting object OB1 and/or the direction in which the interesting object OB1 views, the location where to display the virtual image may keep changing.

The first electronic device 200 may determine a size of the virtual image to be displayed.

The first electronic device 200 may determine the size of the virtual image to be displayed by various methods.

For example, the first electronic device 200 may determine the size of the virtual image to be displayed in consideration of a size of a space except for an area occupied by the interesting object OB1 by analyzing an image obtained in real time.

For example, according to an embodiment, the first electronic device 200 may determine the size of the virtual image to be displayed in consideration of a size of text included in the virtual image so that the text may be displayed to have a size in which the text can be conveniently recognized by people.

For example, according to an embodiment, the first electronic device 200 may determine the size of the virtual image to be displayed based on a gesture input of the interesting object OB1.

The first electronic device 200 may continue to determine in real time the size of the virtual image to be displayed. For example, the first electronic device 200 may once determine the size of the virtual image to be displayed and may subsequently change the size of the virtual image to be displayed rather than displays the virtual image based on the determined size. For example, as the size of the area of the interesting object OB1 varies in the obtained image, the size of the virtual image to be displayed may keep changing.

FIGS. 24 and 25 are views for describing a method of changing a display state of a virtual image according to an embodiment of the present invention.

In the case that a final image FIM1 generated in step S240 is the same as that shown in FIG. 24A, when the interesting object OB1 makes a specific gesture G1 as shown in FIG. 24B, the final image FIM1 shown in FIG. 24A may change to a final image FIM4 shown in FIG. 24C. For example, the size of the virtual image VOB1 included in the final image FIM1 may be enlarged according to the specific gesture G1 of the interesting object OB1.

Similarly, when in the case of an example as shown in FIG. 25A, the specific gesture G2 of the interesting object OB1 is sensed as shown in FIG. 25B, the first electronic device 200 may change a size of a virtual image VOB2 included in a final image FIM2 as shown in FIG. 25A into a size of a virtual image VOB5 included in a final image FIM5 as shown in FIG. 25C. For example, the size of the virtual image may be reduced by the specific gesture G2.

The first electronic device 200 may determine an orientation of the virtual image to be displayed. For example, when the fourth object OB4 is determined as the specific object in the example as shown in FIG. 22, the first electronic device 200 may obtain a virtual image for the fourth object OB4, wherein text included in the fourth object OB4 may be displayed upside down as shown in FIG. 23A. According to an embodiment, the first electronic device 200 may change the orientation of the virtual image to be displayed as shown in FIG. 23B.

The first electronic device 200 may determine a degree of rotation of the virtual image to be displayed.

The first electronic device 200 may determine a location where to display the virtual image by various methods.

For instance, the first electronic device 200 may analyze an image obtained in real time and may determine a rotational state of the virtual, image according to a gesture of the interesting object OB1.

For example, according to an embodiment, the first electronic device 200 may identify a specific sign (e.g., a marker) from an image obtained through the camera 121 and may determine a rotational state of the virtual image according to the rotation of the specific sign. For example, the first electronic device 200 may match a 3D coordinate axis of the virtual image to the specific sign and may rotate the virtual image as the specific sign rotates.

According to an embodiment, the first electronic device 200 may continue to determine in real time the rotational state of the virtual image. For instance, the first electronic device

200 may once determine the rotational state of the virtual image and subsequently change the rotational state of the virtual image to be displayed rather than displays the virtual image based on the determined state.

FIGS. 26A, 26B, and 26C are views for describing a rotational state of a virtual image according to an embodiment of the present invention.

Referring to FIG. 26, in the case that a final image FIM3 generated in step S240 is as shown in FIG. 26A, when the final object OB1 makes a specific gesture G3 as shown in FIG. 26B, the final image FIM3 shown in FIG. 26A may change to a final image FIM6 shown in FIG. 26C. For example, the virtual image VOB3 included in the final image FIM3 may be rotated and displayed according to the specific gesture G3 of the interesting object OB1.

The first electronic device 200 may determine a marking state of the virtual image. For instance, the first electronic device 200 may put various markings, such as an underline, a highlight, or a square, on a content such as a symbol and/or text included in the virtual image, and the marked state may be reflected to the virtual image.

According to the embodiments of the present invention, user who hosts a teleconference and/or a distance lecture need not previously create digitalized data of materials, such as audiovisual documentation, necessary for the conference and share the data with attendants.

Further, the embodiments may provide effects of being able to allow the objects, such as handwritten data or shape of a prototype model, to be immediately shared with other attendants while the conference is on the way. For example, a virtual image for an actual object may be instantly obtained and synthesized with an image for the teleconference, and the synthesized image may be transmitted to other users, thereby enabling data necessary for the conference to be immediately shared with the users in a convenience way.

Further, since data (e.g., objects) to be shared is stored as virtual images and synthesized with images to be transmitted, a user hosting the conference may easily share desired objects with other users without an effort to make to-be-shared objects oriented toward the camera (for example, an effort for the host to proceed with the conference while holding the to-be-shared data).

Further, a user may control the displayed location, size, orientation, and a display state, such as rotational state or marking state, of the interesting object to be shared based on his gesture, so that the teleconference and/or distance lecture may be performed more smoothly.

In the methods of operating an electronic device according to the embodiments, each step is not necessary and according to an embodiment, the steps may be selectively included therein. The steps are not necessary to perform in the order described above, and according to an embodiment, a later step may be performed earlier than an earlier step.

The steps in the methods of operating an electronic device may be performed separately or in combination thereof. According to an embodiment, steps in a method may be performed in combination with steps in another method.

The methods of operating an electronic device may be stored in a computer readable medium in the form of codes or a program for performing the methods.

The invention has been explained above with reference to exemplary embodiments. It will be evident to those skilled in the art that various modifications may be made thereto without departing from the broader spirit and scope of the invention. Further, although the invention has been described in the context its implementation in particular environments and for particular applications, those skilled in the art will recognize that the present invention's usefulness is not limited thereto and that the invention can be beneficially utilized in any number of environments and implementations. The foregoing description and drawings are, accordingly, to be regarded in an illustrative rather than a restrictive sense.

What is claimed is:

1. A method of operating an electronic device, the method comprising:
    obtaining a first image including an interesting object and at least one peripheral object;
    obtaining relevance of the at least one peripheral object with respect to the interesting object based on at least one of attributes including a state, a motion, and a location of the interesting object; and
    replacing an area of the whole area of the first image, which is occupied by the interesting object and the other remaining peripheral objects than a specific peripheral object determined based on the relevance, with a second image.

2. The method of claim 1, wherein obtaining the relevance of the at least one peripheral object is performed in consideration of whether part of the interesting object is connected to the peripheral object.

3. The method of claim 1, wherein obtaining the relevance of the at least one peripheral object is performed in consideration of a motion direction in which at least part of the interesting object moves.

4. The method of claim 1, wherein obtaining the relevance of the at least one peripheral object is performed in consideration of a distance between the interesting object and the at least one peripheral object.

5. The method of claim 1, wherein obtaining the relevance of the at least one peripheral object is performed in further consideration of a user's input on the at least one peripheral object.

6. The method of claim 5, further comprising:
    displaying the first image; and
    receiving the user's input on the displayed first image.

7. The method of claim 6, wherein displaying the first image includes making the interesting object and the first peripheral object different in display property from the remaining peripheral objects.

8. The method of claim 1, further comprising transmitting a third image generated by replacing the area occupied by the remaining peripheral objects with the second image to a second electronic device.

9. The method of claim 1, wherein the first image includes a moving image.

10. A method of operating an electronic device, the method comprising:
    obtaining a first image of an interesting object;
    obtaining a virtual image corresponding to a specific object determined based on a first motion of the interesting object;
    obtaining a final image including the virtual image and at least part of the first image in consideration of a display state of the virtual image determined based on a second object of the second motion; and
    transmitting the final image to a second electronic device.

11. The method of claim 10, wherein the display state of the virtual image includes at least one of a location where the virtual image is to be synthesized, a size, an orientation, a rotational state, and a marking state of the virtual image.

12. The method of claim 10, wherein obtaining the final image includes sensing the second motion in real time and changing the display state of the virtual image based on the sensed second motion.

13. The method of claim 10, wherein obtaining the virtual image includes,
   determining whether the first motion is associated with the specific object, and
   selecting the specific object only when the first motion is associated with the specific object.

14. The method of claim 10, wherein the virtual image is a 2D image or a 3D image.

15. An electronic device comprising:
   a camera; and
      a controller configured to obtain a first image including an interesting object and at least one peripheral object through the camera, to obtain relevance of the at least one peripheral object with respect to the interesting object based on at least one of attributes including a state, a motion, and a location of the interesting object, and to replace an area of the whole area of the first image, which is occupied by the interesting object and the other remaining peripheral objects than a specific peripheral object determined based on the relevance, with a second image.

16. The electronic device of claim 15, wherein the controller is configured to obtain the relevance of the at least one peripheral object is performed in consideration of whether part of the interesting object is connected to the peripheral object.

17. The electronic device of claim 15, wherein the controller is configured to obtain the relevance of the at least one peripheral object is performed in consideration of a motion direction in which at least part of the interesting object moves.

18. The electronic device of claim 15, wherein the controller is configured to obtain the relevance of the at least one peripheral object is performed in consideration of a distance between the interesting object and the at least one peripheral object.

19. The electronic device of claim 15, further comprising:
   a communication unit, wherein the controller is configured to transmit a third image generated by replacing the area occupied by the remaining peripheral objects with the second image to a second electronic device.

20. An electronic device comprising:
   a communication unit;
   a camera; and
   a controller configured to obtain a first image of an interesting object through the camera, to obtain a virtual image corresponding to a specific object determined based on a first motion of the interesting object, to obtain a final image including the virtual image and at least part of the first image in consideration of a display state of the virtual image determined based on a second object of the second motion, and to transmit the final image to a second electronic device through the communication unit.

21. The electronic device of claim 20, wherein the display state of the virtual image includes at least one of a location where the virtual image is to be synthesized, a size, an orientation, a rotational state, and a marking state of the virtual image.

22. The electronic device of claim 20, wherein the controller is configured to sense the second motion in real time and to change the display state of the virtual image based on the sensed second motion.

23. The electronic device of claim 20, wherein the controller is configured to determine whether the first motion is associated with the specific object, and to select the specific object only when the first motion is associated with the specific object.

* * * * *